(12) United States Patent
Tsujikawa et al.

(10) Patent No.: US 10,906,277 B2
(45) Date of Patent: Feb. 2, 2021

(54) LOW-FRICTION MEMBER, IMAGE-FORMING DEVICE, AND AGENT FOR FORMING LOW-FRICTION COATING FILM

(71) Applicant: I.S.T CORPORATION, Shiga (JP)

(72) Inventors: Kazuki Tsujikawa, Shiga (JP); Masaaki Kashiwa, Shiga (JP)

(73) Assignee: I.S.T. CORPORATION, Shiga (JP)

( * ) Notice: Subject to any disclaimer, the term of this patent is extended or adjusted under 35 U.S.C. 154(b) by 299 days.

(21) Appl. No.: 15/324,571

(22) PCT Filed: Aug. 7, 2015

(86) PCT No.: PCT/JP2015/072484
§ 371 (c)(1),
(2) Date: Jan. 6, 2017

(87) PCT Pub. No.: WO2016/021716
PCT Pub. Date: Feb. 11, 2016

(65) Prior Publication Data
US 2017/0203553 A1    Jul. 20, 2017

(30) Foreign Application Priority Data
Aug. 7, 2014 (JP) .................................. 2014-161870

(51) Int. Cl.
*G03G 15/20* (2006.01)
*B32B 27/18* (2006.01)
*B32B 27/28* (2006.01)

(52) U.S. Cl.
CPC ............ *B32B 27/18* (2013.01); *B32B 27/281* (2013.01); *G03G 15/2057* (2013.01);
(Continued)

(58) Field of Classification Search
CPC ....... B32B 27/34; B32B 27/18; B32B 27/281; B32B 2307/746; B32B 2433/00;
(Continued)

(56) References Cited

U.S. PATENT DOCUMENTS

| 7,672,633 B2 | 3/2010 | Kondoh |
| 2008/0101831 A1 | 5/2008 | Kondoh |

(Continued)

FOREIGN PATENT DOCUMENTS

| CN | 101120289 A | 2/2008 |
| CN | 101174122 A | 5/2008 |

(Continued)

OTHER PUBLICATIONS

Machine translation of JP 2004-160431. (Year: 2004).*
(Continued)

*Primary Examiner* — John D Freeman
(74) *Attorney, Agent, or Firm* — Hamre, Schumann, Mueller & Larson, P.C.

(57) ABSTRACT

A problem addressed by the present invention is to provide a low-friction member which does not easily lose low-friction properties thereof even when used for a relatively long period. The low-friction member LS according to the present invention is consisting of at least lubricating materials PL, PS and a polyimide resin MR. The low-friction member has a surface roughness Rsk or 0.500 or more and the surface exposure ratio of the lubricating materials of 15.0% or more. It is particularly preferred that the surface roughness Rsk be in a range of 0.0900 (inclusive) to 0.1400 (inclusive), and the surface exposure ratio of the lubricating materials be 35.0% or more. It is preferred that the lubricating materials be a fluororesin. The low-friction member thus has the property of not losing the low-friction properties thereof easily even when used for a relatively long period.

3 Claims, 12 Drawing Sheets

(52) U.S. Cl.
CPC ............. *B32B 2264/0257* (2013.01); *B32B 2264/3065* (2020.08); *B32B 2307/746* (2013.01); *B32B 2433/00* (2013.01); *Y10T 428/254* (2015.01); *Y10T 428/31721* (2015.04)

(58) Field of Classification Search
CPC .... B32B 2264/3065; B32B 2264/0257; G03G 15/2057; G03G 15/2053; G03G 2215/2035; Y10T 428/254; Y10T 428/31721; C10M 107/38; C10M 2213/0623; C10N 2030/06; C10N 2020/06; C10N 2050/14
See application file for complete search history.

(56) References Cited

U.S. PATENT DOCUMENTS

| | | | | |
|---|---|---|---|---|
| 2008/0149211 | A1* | 6/2008 | Yamada | C08L 27/18 138/145 |
| 2010/0129580 | A1* | 5/2010 | Sandaiji | B32B 1/08 428/36.91 |

FOREIGN PATENT DOCUMENTS

| | | |
|---|---|---|
| CN | 101675131 A | 3/2010 |
| JP | H0366914 | 3/1991 |
| JP | 05-025295 | 2/1993 |
| JP | H05125295 A | 5/1993 |
| JP | H10213984 | 8/1998 |
| JP | 2000136397 A * | 5/2000 |
| JP | 2001219122 A * | 8/2001 |
| JP | 2001249558 | 9/2001 |
| JP | 2004160431 A * | 6/2004 |
| JP | 2005134791 | 5/2005 |
| JP | 2007322751 | 12/2007 |
| JP | 2008112150 | 5/2008 |
| JP | 2009045577 | 3/2009 |

OTHER PUBLICATIONS

Machine translation of JP 2001-219122. (Year: 2001).*
International Search Report (with English and Japanese) and Written Opinion of International Application No. PCT/JP2015/072484, dated Sep. 15, 2015, total 10 pages.

* cited by examiner

LOW-FRICTION MEMBER, IMAGE-FORMING DEVICE, AND AGENT FOR FORMING LOW-FRICTION COATING FILM

TECHNICAL FIELD

The present invention relates to a low-friction member, in particular to a low-friction member for use in a fixing device of an electrophotographic apparatus such as a copier, a printer, and a facsimile apparatus.

BACKGROUND ART

In electrophotographic image formation in a printer, a copier, a facsimile apparatus, and the like, a non-fixed toner image needs to be fixed on a recording paper, etc. through heating and pressurizing, while conveying to an image fixing device the recording paper, etc. on which the non-fixed toner image has been formed. A belt nip system using a tubular film made from a heat-resistant resin is well known as such an image fixing system. In the belt nip system, a nip is formed between a drive-type fixing roll and a tubular film by pressing the tubular film from the inner side thereof against the fixing roll by using an elastic body having the surface thereof covered with a low-friction sheet. In the belt nip system, a toner image is fixed to recording paper as the recording paper on which the toner image has been formed passes through the nip.

In the prior art, it is been suggested to cover the surface of the elastic body with a fluororesin-coated glass fiber sheet in order to control the friction coefficient of the tubular film and the low-friction sheet in the above-described belt nip system (see, for example, Japanese Patent Application Publications No. H10-213984 and 2001-249558).

CITATION LIST

Patent Literature

[PTL 1] Japanese Patent Application Publication No. H10-213984.
[PTL 2] Japanese Patent Application Publication No. 2001-249558.

SUMMARY OF INVENTION

Technical Problem

However, in such fluororesin-coated glass fiber sheet, the glass fibers are bared within a relatively small amount of time and low-friction properties of the sheet are lost. Where the low-friction properties of the fluororesin-coated glass fiber sheet are thus lost, the driving torque of the fixing roll is increased and load on other components is eventually increased. In the worst case, the fixing device ends up being damaged.

A problem addresses by the present invention is to provide a low-friction member which does not easily lose low-friction properties thereof even when used for a relatively long period.

Solution to Problem

A low-friction member according to a first aspect of the present invention consists of at least a lubricating material and a polyimide resin. Incidentally, it is preferred that the low-friction member be a low-friction sheet itself or a member having the low-friction sheet or a low-friction coating layer, and the same effect is demonstrated with either of these forms. In this case, it is preferred that the thickness of the low-friction sheet or the low-friction coating layer be in a range of 10 μm (inclusive) to 200 μm (inclusive). Further, in the low-friction member, a surface roughness Rsk is 0.500 or more and a surface exposure ratio of the lubricating material is 15.0% or more. Incidentally, in the low-friction member according to the first aspect of the present invention, the surface roughness Rsk may be in a range of 0.500 (inclusive) to 5.000 (inclusive) and the surface exposure ratio of the lubricating material may be in a range of 15.0% (inclusive) to 100.0% (inclusive). The surface of the present low-friction member may be completely covered with the lubricating material or may be a mixed-phase surface having a lubricating material phase and a heat-resistant resin phase.

Such a low-friction member is obtained by mixing powders made from lubricating material of at least two types that differ in a median diameter with the polyimide resin or a precursor of the polyimide resin, and then baking same. When the low-friction member according to the present invention is thus produced, it is preferred that a first lubricating powder with a median diameter in a range of 10 μm (inclusive) to 100 μm (inclusive) and a second lubricating powder with a median diameter in a range of 0.1 μm (inclusive) to 5 μm (inclusive) be used as the powders made from lubricating material of at least two types that differ in a median diameter. Further, in this case, it is preferred that the addition percentage of the first lubricating powder, as represented by a volume percentage, be in a range of 0.1 vol % (inclusive) to 40 vol % (inclusive) with respect to a total volume of a presence region of the polyimide resin, the first lubricating powder, and the second lubricating powder (that is, a region formed by at least the polyimide resin, the first lubricating powder, and the second lubricating powder, for example, the low-friction sheet, the low-friction coating layer, a low-friction block, and the like). Meanwhile, it is preferred that the addition percentage of the second lubricating powder, as represented by a volume percentage, be in a range of 10 vol % (inclusive) to 80 vol % (inclusive) with respect to the aforementioned total volume.

The results of the comprehensive research conducted by the inventors of the present application indicate that the low-friction member having the above-described properties does not easily lose low-friction properties thereof even when used for a relatively long period.

Incidentally, in the low-friction member according to the first aspect of the present invention, it is preferred that the lubricating material be a fluororesin.

Further, in the low-friction member according to the present invention, it is preferred that a dynamic friction coefficient after 10 minutes in a sliding wear test (JIS K 7218) be 0.1300 or less. Incidentally, it is preferred that the dynamic friction coefficient be as low as possible, but it may be in a range of 0.0500 (inclusive) to 0.1300 (inclusive).

Further, in the low-friction member according to the first aspect of the present invention, it is preferred that a variation rate of the dynamic friction coefficient after 10 minutes with respect to an initial dynamic friction coefficient be 120% or less. Incidentally, it is preferred that the variation rate of the dynamic friction coefficient be as low as possible, but it may be in a range of 80% (inclusive) to 120% (inclusive).

Further, in the low-friction member according to the first aspect of the present invention, it is preferred that a dynamic friction coefficient after 100 minutes in the sliding wear test (JIS K 7218) be 0.1800 or less. Incidentally, it is preferred that the dynamic friction coefficient be as low as possible, but it may be in a range of 0.0500 (inclusive) to 0.1800 (inclusive).

Further, in the low-friction member according to the first aspect of the present invention, it is preferred that a variation rate of the dynamic friction coefficient after 100 minutes with respect to the initial dynamic friction coefficient be 180% or less. Incidentally, it is preferred that the variation rate of the dynamic friction coefficient be as low as possible, but it may be in a range of 70% (inclusive) to 180% (inclusive).

Further, in the low-friction member according to the first aspect of the present invention, it is preferred that the surface roughness Rsk be 0.900 or more. Incidentally, in the low-friction member according to the present invention, the surface roughness Rsk may be in a range of 0.900 (inclusive) to 5.000 (inclusive). In this case, it is preferred that the dynamic friction coefficient after 10 minutes in the sliding wear test (JIS K 7218) of the low-friction member be less than 0.1000. Incidentally, it is preferred that the dynamic friction coefficient be as low as possible, but it may be in a range of 0.0500 (inclusive) to 0.1000 (inclusive). Further, in this case, it is preferred that the variation rate of the dynamic friction coefficient after 10 minutes with respect to the initial dynamic friction coefficient in the low-friction member be 120% or less. Incidentally, it is preferred that the variation rate of the dynamic friction coefficient be as low as possible, but it may be in a range of 80% (inclusive) to 120% (inclusive). Further, in this case, it is preferred that the dynamic friction coefficient after 100 minutes in the sliding wear test (JIS K 7218) of the low-friction member be less than 0.1000. Incidentally, it is preferred that the dynamic friction coefficient be as low as possible, but it may be in a range of 0.0500 (inclusive) to 0.1000 (inclusive). Furthermore, in this case, it is preferred that the variation rate of the dynamic friction coefficient after 100 minutes with respect to the initial dynamic friction coefficient in the low-friction member be 110% or less. Incidentally, it is preferred that the variation rate of the dynamic friction coefficient be as low as possible, but it may be in a range of 70% (inclusive) to 110% (inclusive).

Further, in the low-friction member according to the first aspect of the present invention, it is preferred that the surface exposure ratio of the lubricating material be 35.0% or more. Incidentally, as mentioned hereinabove, in the low-friction member according to the present invention, the surface exposure ratio of the lubricating material may be in a range of 35.0% (inclusive) to 100.0% (inclusive). In this case, it is preferred that the dynamic friction coefficient after 10 minutes in the sliding wear test (JIS K 7218) of the low-friction member be less than 0.0800. Incidentally, it is preferred that the dynamic friction coefficient be as low as possible, but it may be in a range of 0.0500 (inclusive) to less than 0.0800. Furthermore, in this case, it is preferred that the variation rate of the dynamic friction coefficient after 10 minutes with respect to the initial dynamic friction coefficient in the low-friction member be 110% or less. Incidentally, it is preferred that the variation rate of the dynamic friction coefficient be as low as possible, but it may be in a range of 90% (inclusive) to 110% (inclusive). Further, in this case, it is preferred that the dynamic friction coefficient after 100 minutes in the sliding wear test (JIS K 7218) of the low-friction member be less than 0.0800. It is preferred that the dynamic friction coefficient be as low as possible, but it may be in a range of 0.0500 (inclusive) to less than 0.0800. Furthermore, in this case, it is preferred that the variation rate of the dynamic friction coefficient after 100 minutes with respect to the initial dynamic friction coefficient in the low-friction member be 110% or less. It is preferred that the variation rate of the dynamic friction coefficient be as low as possible, but it may be in a range of 70% (inclusive) to 110% (inclusive).

When the surface exposure ratio of the lubricating material in the low-friction member according to the first aspect of the present invention is in a range of 35.0% (inclusive) to 100.0% (inclusive), it is preferred that the surface roughness Rsk be more than 1.400. In this case, the surface roughness Rsk may be in a range of more than 1.400 to 5.000 (inclusive).

Meanwhile, when the surface exposure ratio of the lubricating material in the low-friction member according to the first aspect of the present invention is in a range of 35.0% (inclusive) to 100.0% (inclusive), it is preferred that the surface roughness Rsk be in a range of 0.900 (inclusive) to 1.400 (inclusive). In this case, in the low-friction member according to the present invention, it is preferred that the dynamic friction coefficient after 10 minutes in the sliding wear test (JIS K 7218) be less than the initial dynamic friction coefficient, and the dynamic friction coefficient after 100 minutes in the same sliding wear test (JIS K 7218) be less than the dynamic friction coefficient after 10 minutes.

Further, a low-friction member according to a second aspect of the present invention also consists of at least a lubricating material and a polyimide resin. Incidentally, it is preferred that the low-friction member be a low-friction sheet itself or a member having the low-friction sheet or a low-friction coating layer. In this case, it is preferred that the thickness of the low-friction sheet or the low-friction coating layer be in a range of 10 μm (inclusive) to 200 μm (inclusive). Further, in the low-friction member, a dynamic friction coefficient after 10 minutes in a sliding wear test (JIS K 7218) is 0.1000 or less, and a variation rate of the dynamic friction coefficient after 10 minutes to an initial dynamic friction coefficient is in a range of 190% or less.

Such low-friction member is obtained by mixing powders made from lubricating material of at least two types that differ in a median diameter with the polyimide resin or a precursor of the polyimide resin, and then baking same. Further, when the low-friction member according to the present invention is thus produced, it is preferred that a first lubricating powder with a median diameter in a range of 10 μm (inclusive) to 100 μm (inclusive) and a second lubricating powder with a median diameter in a range of 0.1 μm (inclusive) to 5 μm (inclusive) be used as the powders made from lubricating material of at least two types that differ in a median diameter. Further, in this case, it is preferred that the addition percentage of the first lubricating powder, as represented by a volume percentage, be in a range of 0.1 vol % (inclusive) to 40 vol % (inclusive) with respect to a total volume of a presence region of the polyimide resin, the first lubricating powder, and the second lubricating powder (that is, a region formed by at least the polyimide resin, the first lubricating powder, and the second lubricating powder, for example, the low-friction sheet, the low-friction coating layer, a low-friction block, and the like). Meanwhile, it is preferred that the addition percentage of the second lubricating powder, as represented by a volume percentage, be in a range of 10 vol % (inclusive) to 80 vol % (inclusive) with respect to the aforementioned total volume.

In the low-friction member according to the second aspect of the present invention, it is preferred that the variation rate of the dynamic friction coefficient after 10 minutes to the initial dynamic friction coefficient be in a range of 120% or less. Incidentally, it is preferred that the variation rate of the dynamic friction coefficient be as low as possible, but it may be in a range of 80% (inclusive) to 120% (inclusive).

Further, in the low-friction member according to the second aspect of the present invention, it is preferred that a dynamic friction coefficient after 100 minutes in the sliding wear test (JIS K 7218) be 0.1800 or less. Incidentally, it is preferred that the dynamic friction coefficient be as low as possible, but it may be in a range of 0.0500 (inclusive) to 0.1800 (inclusive).

Further, in the low-friction member according to the second aspect of the present invention, it is preferred that a variation rate of the dynamic friction coefficient after 100 minutes with respect to the initial dynamic friction coefficient be 180% or less. Incidentally, it is preferred that the variation rate of the dynamic friction coefficient be as low as possible, but it may be in a range of 70% (inclusive) to 180% (inclusive).

Further, in the low-friction member according to the second aspect of the present invention, it is preferred that the dynamic friction coefficient after 10 minutes in the sliding wear test (JIS K 7218) be less than the initial dynamic friction coefficient, and the dynamic friction coefficient after 100 minutes in the sliding wear test (JIS K 7218) be less than the dynamic friction coefficient after 10 minutes.

Further, in the low-friction member according to the second aspect of the present invention, it is preferred that the lubricating material be a fluororesin.

Further, in the low-friction member according to the second aspect of the present invention, it is preferred that a surface roughness Rsk be 0.500 or more, and a surface exposure ratio of the lubricating material be 15.0% or more.

Incidentally, in the low-friction member according to the second aspect of the present invention, the surface roughness Rsk may be in a range of 0.500 (inclusive) to 5.000 (inclusive) and the surface exposure ratio of the lubricating material may be in a range of 15.0% (inclusive) to 100.0% (inclusive). The surface of the present low-friction member may be completely covered with the lubricating material or may be a mixed-phase surface having a lubricating material phase and a heat-resistant resin phase.

An image forming apparatus according to the third aspect of the present invention is provided with the low-friction members according to the above-described first aspect or second aspect. Incidentally, in this case, the low-friction member can be used as a sliding member or the like.

An agent for forming a low-friction coating according to the fourth aspect of the present invention is obtained by adding "a lubricating powder with a median diameter in a range of 10 μm (inclusive) to 100 μm (inclusive)" and "a lubricating powder with a median diameter in a range of 0.1 μm (inclusive) to 5 μm (inclusive)" to a polyimide precursor solution and includes the polyimide precursor solution and the lubricating powders of at least above-mentioned two types. The low-friction members according to the first aspect and second aspect of the present invention can be obtained by coating the agent for forming a low-friction coating film on a base material or a substrate and then baking same.

REFERENCE SIGNS LIST

Figure 1:
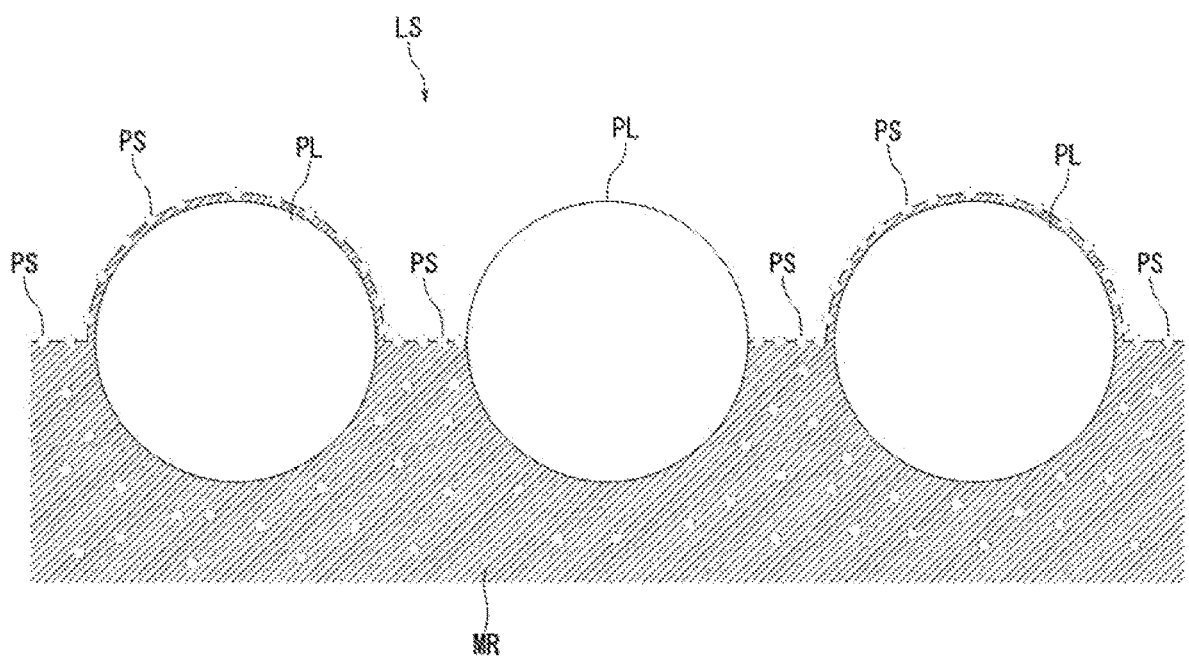
FIG. 1 shows schematically a structure close to the surface of the low-friction member according to the first embodiment of the present invention.

100 Fixing belt type fixing device (image forming apparatus)
110 Pressurizing belt type fixing device (image forming apparatus)
120 Color image fixing device (image forming apparatus)
130 Color image fixing device (image forming apparatus)
140 Belt type fixing device (image forming apparatus)
150 Belt type fixing device (image forming apparatus)
160 Fixing belt type fixing device (image forming apparatus)
170 Belt type fixing device (image forming apparatus)
180 Fixing belt type fixing device (image forming apparatus)
190 Fixing belt type fixing device (image forming apparatus)
200 Fixing roll type fixing device (image forming apparatus)
LS Low-friction member
MR Heat-resistant resin
PL Large-diameter lubricating particle
PS Small-diameter lubricating particle

DESCRIPTION OF EMBODIMENTS

The explanation below is conducted with reference to figures. In the figures, same or corresponding portions are assigned with same reference numerals, and the explanation thereof is not repeated to avoid redundancy of explanation.
<Detailed Explanation of Low-Friction Member>
1) Configuration of Low-Friction Member
The low-friction member according to the embodiment of the present invention is, for example, "a low-friction sheet itself", "a member coated with the low-friction sheet", and a "member having a low-friction coating layer". The low-friction sheet and the low-friction coating layer (abbreviated hereinbelow as "low-friction sheet, etc.") are composed of at least a lubricating material and a heat-resistant resin. The low-friction sheet, etc., demonstrates the surface exposure ratio of the lubricating material of 15% or more and the surface roughness Rsk of 0.500 or more.

Examples of the heat-resistant resin constituting the low-friction sheet, etc., according to the embodiment of the present invention include a polyimide resin, a polyamido-imide resin, a polyetherimide resin, a polyethersulfone resin, a polyether ether ketone resin, a phenolic resin, a silicone rubber, a polyphenylene sulfide, and liquid-crystal polymers. These heat-resistant resins may be used individually or in a mixture of two or more thereof. Incidentally, the heat-resistant resin can be selected, as appropriate, from the choices listed above, according to the usage environment and intended use, but among them, a polyimide resin is preferred.

A polyimide resin is obtained, for example, by reacting an aromatic tetracarboxylic acid dianhydride and an aromatic diamine in an organic polar solvent to obtain a polyimide precursor solution and then coating this solution and performing drying of the organic polar solvent and imidization by heating, or the like.

Examples of the aromatic tetracarboxylic acid dianhydride include, but are not limited to, pyromellitic dianhydride, 3,3',4,4'-biphenyltetracarboxylic acid dianhydride, 3,3',4,4'-benzophenonetetracarboxylic dianhydride, 2,3,4,4'-biphenyltetracarboxylic acid dianhydride, 2,3,6,7-naphthalenetetracarboxylic acid dianhydride, 1,2,5,6-naphthalenetetracarboxylic acid dianhydride, 2,2-bis(3,4-dicarboxyphenyl)ether dianhydride, or tetracarboxylic acid esters thereof, and mixtures of the tetracarboxylic acids.

Examples of the aromatic diamine include, but are not limited to, para-phenylenediamine, meta-phenylenediamine, 4,4'-diaminodiphenyl ether, 4,4'-diaminodiphenyl methane, benzidine, 3,3'-diaminodiphenyl methane, 3,3'-dimethoxybenzidine, 4,4'-diaminodiphenyl propane, and 2,2-bis [4-(4-aminophenoxy)phenyl] propane.

Examples of the organic polar solvents include, but are not limited to, dimethylacetamide, dimethylformamide, N-methyl-2-pyrrolidone, phenol, and O-, M-, and P-cresols. These organic polar solvents may be mixed with hydrocarbons such as xylene, hexane, and toluene.

Examples of the lubricating material constituting the low-friction sheet, etc., according to the embodiment of the present invention include fluororesins, graphite, molybdenum disulfide, and boron nitride (BN). These lubricating materials may be used individually or in a mixture of two or more thereof. The lubricating material can be selected, as appropriate, from the choices listed above, according to the usage environment and intended use, but among them, a fluororesin is preferred. This is because a worn fluororesin can stay on the inner circumferential surface of a fixing belt and work as a lubricant.

(2) Method for Manufacturing Low-Friction Member

The low-friction sheet, etc., according to the embodiment of the present invention can be produced through a coating step and a coating formation step. Described herein is merely an exemplary method for manufacturing the low-friction sheet, etc., and this method is not the only one suitable for this purpose.

In the coating step, the solution of a heat-resistant resin or the precursor of a heat-resistant resin to which powders made from lubricating material of at least two types that differ in a median diameter have been added (referred to hereinbelow as "different-diameter lubricating powder-containing heat-resistant resin, etc., solution") is uniformly coated on a base material or a substrate. Incidentally, a coating method in this case is not particularly limited, and well-known methods, for example, coating methods such as a spin coating method, an extrusion method, a gravure coating method, a die coating method, a slit coating method, a bar coating method, and an applicator method, and printing methods such as a flexo method can be used. Further, the base material may have any shape, for example, a plate shape, a curved surface shape, an L-like shape, a cylindrical shape, a round columnar shape, or combinations thereof. The base material may be also in the form of a foamed body, or the like. The material type of the base material is not particularly limited. For example, metal materials such as stainless steel, aluminum, aluminum alloys, copper, copper alloys, nickel, iron, magnetic stainless steel, and cobalt-nickel alloys, rubber materials such as silicone rubbers and fluorine rubbers, resin materials such as polyethersulfones, polyphenylenesulfides, liquid crystal polymers, polyethernitriles, polyimides, aromatic polyamides, polyamidoimides, polyether ether ketones, polyesters, and polyethylene terephthalate, electrically conducive materials such as electrically conducive ceramics, graphite, electrically conductive carbon, and metal powders, and electrically insulating materials such as electrically insulating ceramics (glass) can be used.

In the coating formation step, the coating liquid formed on the base material or on the substrate in the coating step is heated and baked to form a coating. Incidentally, in this case, the low-friction sheet is obtained by peeling off the coating from the substrate. The low-friction sheet may be thereafter pasted, through an adhesive or the like, onto a desired member. Further, a member having a low-friction coating layer can be obtained and used as is, without peeling off the coating from the base material.

The low-friction sheet, etc., thus obtained is basically presumed to have a structure such as shown in FIG. 1. However, when the lubricating material, such as a fluororesin, is melted by heating and baking in the coating formation step, a more complex structure is presumed to be obtained. Incidentally, in FIG. 1, the reference symbol LS denotes the low-friction member, PL—a large-diameter lubricating powder, PS—a small-diameter lubricating powder, and MR—a heat-resistant resin (matrix resin).

<Properties of Low-Friction Member>

The low-friction member according to the embodiment of the present invention has a surface roughness Rsk of 0.500 or more and the surface exposure ratio of the lubricating material of 15.0% or more. As a result of having such two properties together, the low-friction member demonstrates dynamic friction ability superior to that of the conventional fluororesin-coated glass fiber sheets.

It is particularly preferred that the low-friction member according to the embodiment of the present invention have both the surface roughness Rsk in a range of 0.900 (inclusive) to 1.400 (inclusive) and the surface exposure ratio of the lubricating material of 35.0% or more. This is because in the low-friction member having such properties, an initial dynamic friction coefficient of 0.0800 or less is demonstrated, while also the dynamic friction coefficient tends to decrease gradually with the passage of time in an accelerated friction wear test.

Further, another preferred low-friction member according to the embodiment of the present invention has both the surface roughness Rsk above 1.400 and the surface exposure ratio of the lubricating material of 35.0% or more. This is because in the low-friction member having such properties, an initial dynamic friction coefficient of 0.0800 or less is demonstrated, while also a dynamic friction coefficient which is very stable over time is demonstrated in the accelerated friction wear test.

Further, another preferred low-friction member according to the embodiment of the present invention has both the surface roughness Rsk above 1.000 and the surface exposure ratio of the lubricating material in a range of 15.0% (inclusive) to less than 35.0%. This is because in the low-friction member having such properties, an initial dynamic friction coefficient in a range of 0.0800 (inclusive) to less than 0.1000 is demonstrated, while also a dynamic friction coefficient which is very stable over time is demonstrated in the accelerated friction wear test.

Finally, another preferred low-friction member according to the embodiment of the present invention has both the surface roughness Rsk in a range of 0.500 (inclusive) to 1.000 (inclusive) and the surface exposure ratio of the lubricating material in a range of 15.0% (inclusive) to less than 35.0%. This is because in the low-friction member having such properties, an initial dynamic friction coefficient of 0.0800 or less is demonstrated, and although the dynamic friction coefficient tends to rise in the accelerated friction wear test, a very stable dynamic friction coefficient is demonstrated within a short interval of time.

Application Examples of Low-Friction Material (1) Application Example 1

Figure 2:
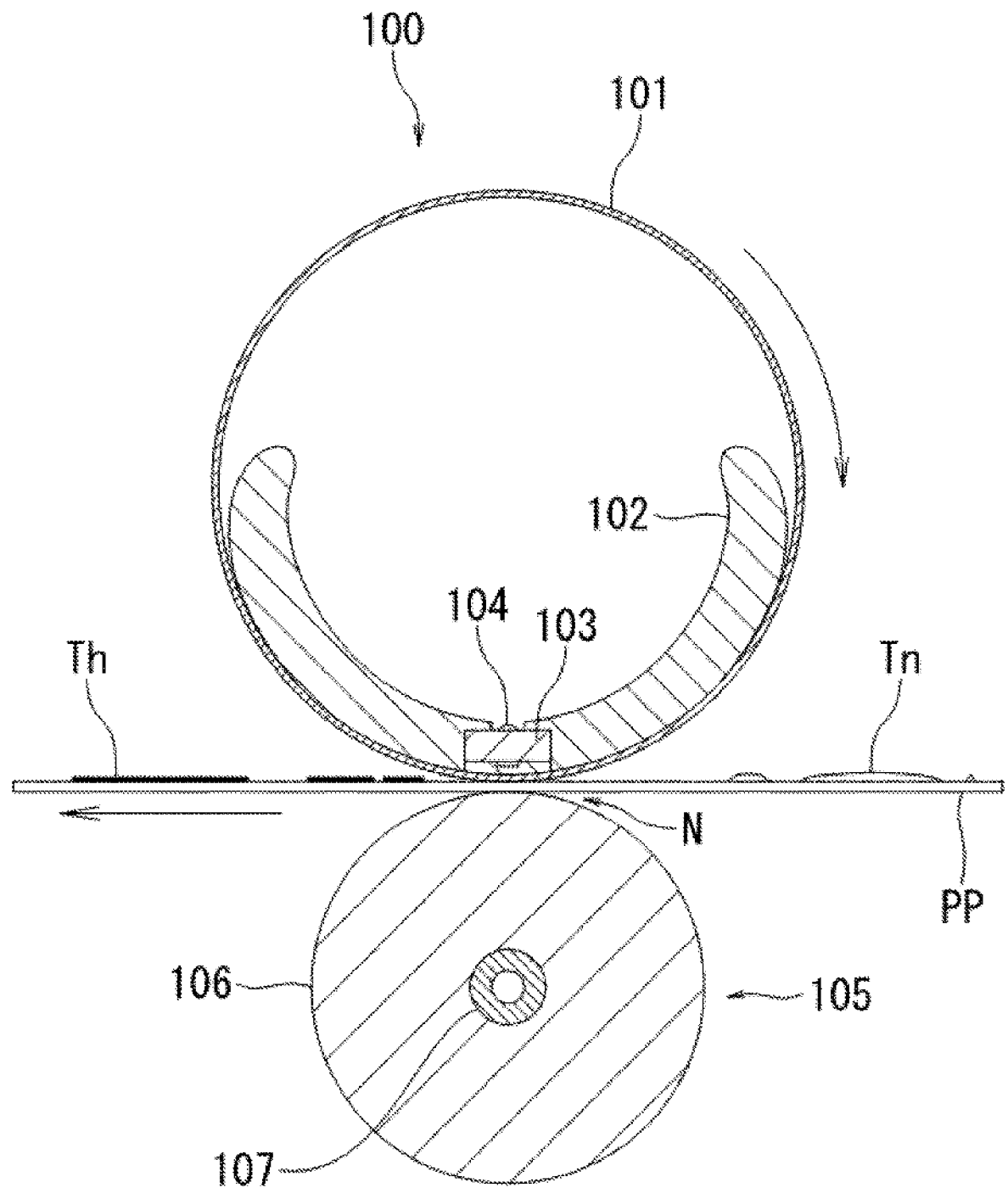
FIG. 2 is a vertical sectional view of a fixing belt type fixing device according to Application Example 1 according to the embodiment of the present invention.

The low-friction member according to the embodiment of the present invention can be applied to a fixing belt type fixing device 100 such as depicted in FIG. 2. As depicted in FIG. 2, the fixing belt type fixing device 100 is mainly configured of a fixing belt 101, belt guides 102, a heater 103, a thermistor 104, and a pressurizing roll 105. As depicted in FIG. 2, the belt guides 102 are provided on the inner side of the fixing belt 101, and the shape of the fixing belt 101 is held by the belt guides 102. Further, in the fixing belt type fixing device 100, as depicted in FIG. 2, the heater 103 is provided in the lower portion on the inner side of the fixing belt 101 so as to be sandwiched by the belt guides 102. Incidentally, the thermistor 104 is disposed on the upper surface of the heater 103, and the heater 103 and the thermistor 104 are together connected to a control device (not depicted in the figure). The control device controls the heat generation temperature of the heater 103 on the basis of temperature data outputted from the thermistor 104. As depicted in FIG. 2, the pressurizing roll 105 is a roll where a rubber layer 106 is formed on a metal core 107, and is pressed against the heater 103 through the fixing belt 101. Further, as depicted in FIG. 2, where recording paper PP on which an unfixed toner image Tn has been formed is successively fed between the fixing belt 101 and the pressurizing roll 105, the unfixed toner is successively heated and melted by the fixing belt 101 heated by the heater 103, and the unfixed toner image Tn is fixed on the recording paper in a nip N (in FIG. 2, the reference symbol Th denotes the fixed toner image).

In such fixing belt type fixing device 100, the present invention can be used for the belt guide 102 or the heater 103. For example, it is conceivable to provide the low-friction coating layer according to the present invention or to paste the low-friction sheet according to the present invention on the surface of the belt guide 102 that is to be in contact with the fixing belt 101. It is also possible to provide the low-friction coating layer according to the present invention or to paste the low-friction sheet according to the present invention on a material with good thermal conductivity, and then attach the material with good thermal conductivity to the lower surface of the heater 103 so that the low-friction sheet, etc., is in contact with the inner circumferential surface of the fixing belt 101.

(2) Application Example 2

Figure 3:
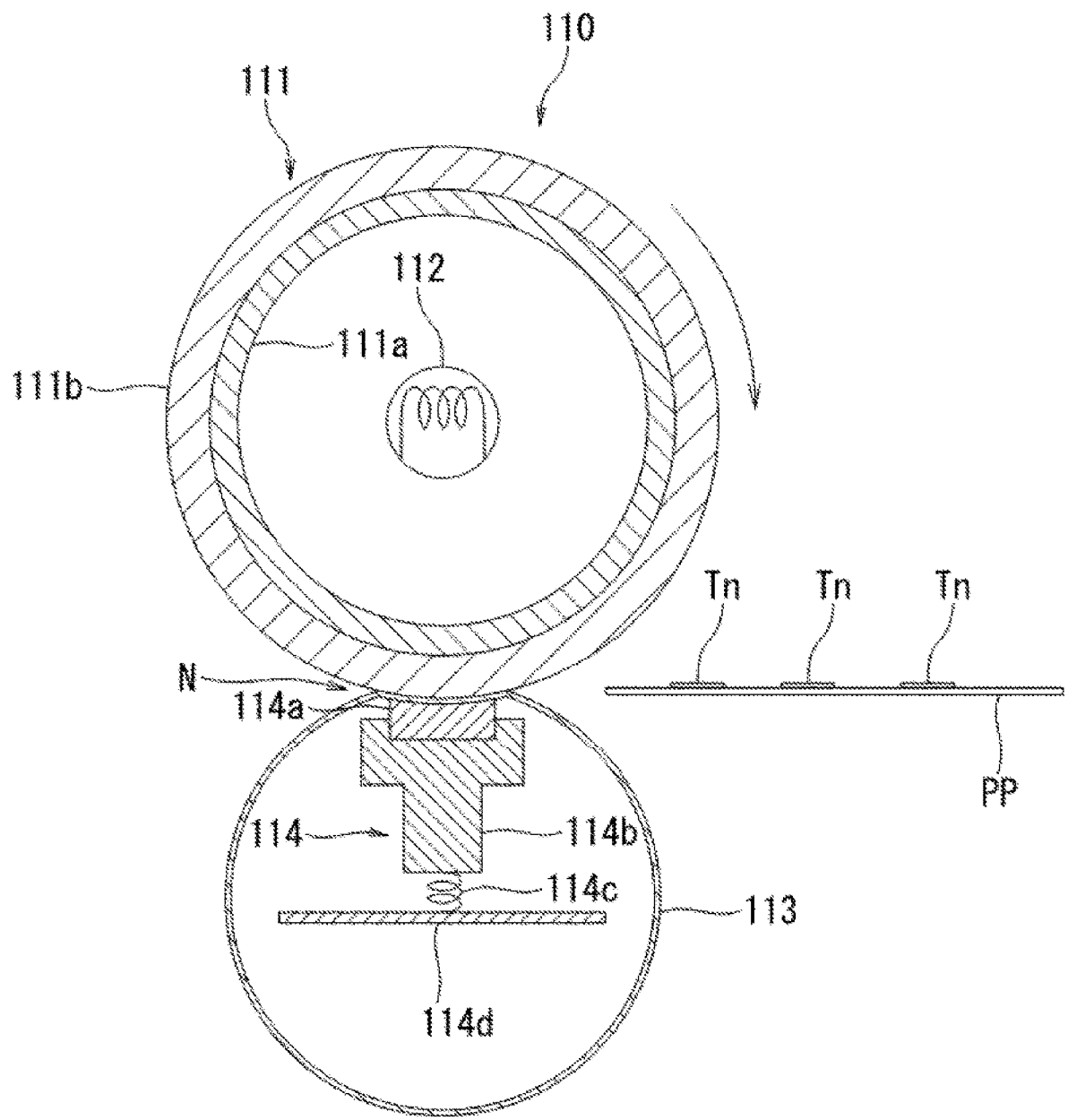
FIG. 3 is a vertical sectional view of a pressurizing belt type fixing device according to Application Example 2 according to the embodiment of the present invention.

The low-friction member according to the embodiment of the present invention can be also applied to a pressurizing belt type fixing device 110 such as depicted in FIG. 3. As depicted in FIG. 3, the pressurizing belt type fixing device 110 is mainly configured of a fixing roll 111, a halogen lamp heater 112, a pressurizing belt 113, and a pressing mechanism 114. In the fixing roll, a rubber layer 111b is formed on a metal core 111a. The halogen lamp heater 112 is a heating source provided, as depicted in FIG. 3, inside the fixing roll 111. Further, as depicted in FIG. 3, the pressing mechanism 114 is mainly configured of a pressing pad 114a, a pressing pad support member 114b, a biasing member 114c, and a support base 114d and provided on the inner side of the pressurizing belt 113. As depicted in FIG. 3, the support base 114d is linked to the pressing pad support member 114b through the biasing member 114c. Further, as depicted in FIG. 3, the pressing pad 114a is attached to the distal end portion of the pressing pad support member 114b. In the pressing mechanism 114, the pressing pad 114a is pushed against the pressurizing belt 113 from the inner side of the pressurizing belt 113 by the biasing force of the biasing member 114c, thereby pressing the pressurizing belt 113 into contact with the fixing roll 111. A nip N is thus formed in the pressurizing belt type fixing device 110. Further, as depicted in FIG. 3, where recording paper PP on which an unfixed toner image Tn has been formed is successively fed between the fixing roll 111 and the pressurizing belt 113, the unfixed toner is successively heated and melted by the fixing roll 111 heated by the halogen lamp heater 112, and the unfixed toner image Tn is fixed on the recording paper PP in the nip N.

In such pressurizing belt type fixing device 110, the present invention can be used for the pressing pad 114a. For example, it is conceivable to provide the low-friction coating layer according to the present invention or to paste the low-friction sheet according to the present invention on the surface of the pressing pad 114a that is to be in contact with the pressurizing belt 113.

(3) Application Example 3

Figure 4:
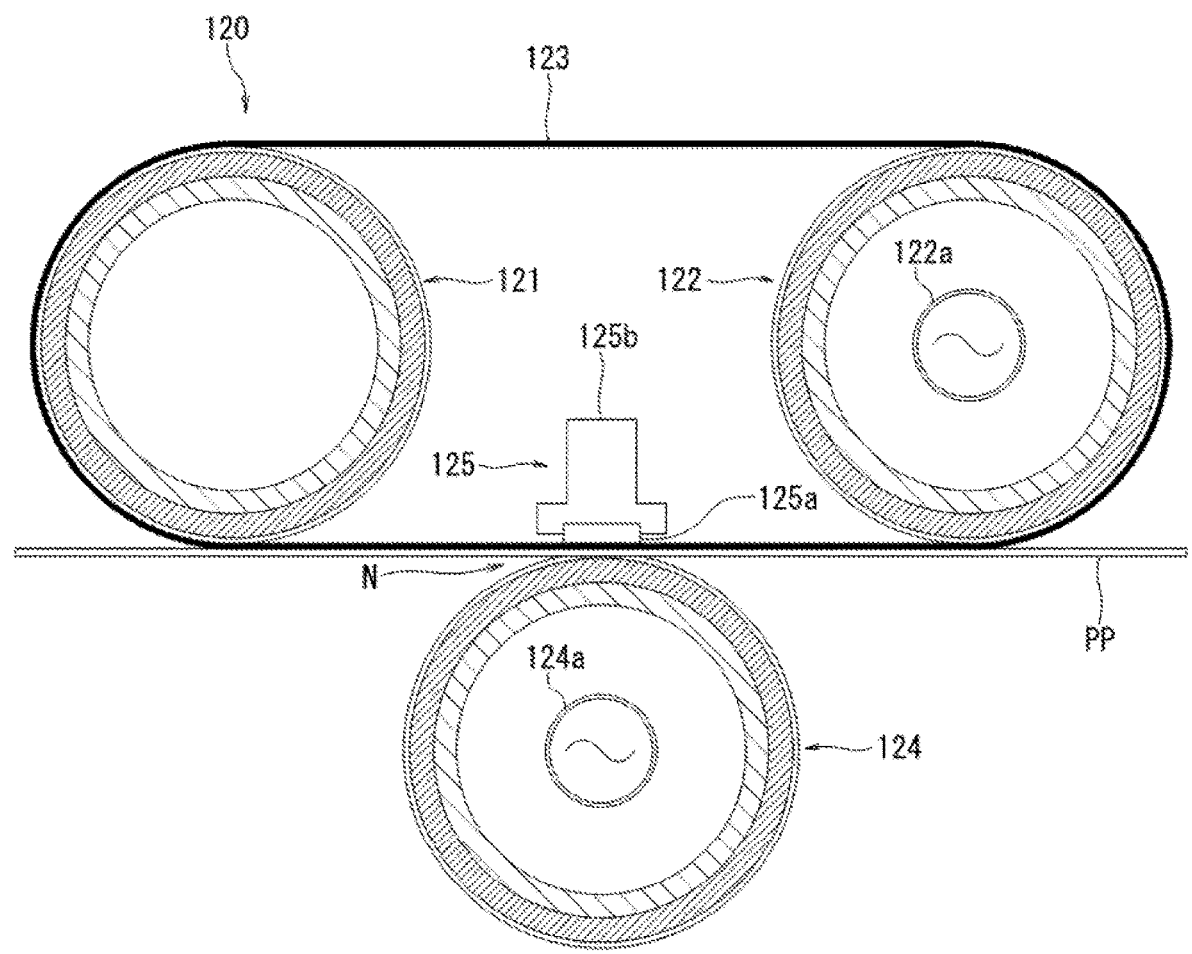
FIG. 4 is a vertical sectional view of a color image fixing device according to Application Example 3 according to the embodiment of the present invention.

The low-friction member according to the embodiment of the present invention can be also applied to a color image fixing device 120 such as depicted in FIG. 4. As depicted in FIG. 4, the color image fixing device 120 is mainly configured of a drive support roll 121, a heater 122a, a driven support roll 122, a fixing belt 123, a pressurizing roll 124, a heater 124a, and a pressing mechanism 125. The drive support roll 121 is provided, as depicted in FIG. 4, at a position spaced by a predetermined distance from the driven support roll 122 so as to face the driven support roll 122. As depicted in FIG. 4, the fixing belt 123 is placed over the drive support roll 121 and the driven support roll 122. Further, as depicted in FIG. 4, the pressing mechanism 125 is provided in the lower portion of the space between the drive support roll 121 and the driven support roll 122 on the inner side of the fixing belt 123. The pressurizing roll 124 is provided, as depicted in FIG. 4, so as to face the pressing mechanism 125, with the fixing belt 123 being interposed therebetween. The heater 122a is provided inside the driven support roll 122, and the heater 124a is provided inside the pressurizing roll 124. The pressing mechanism 125 has the same structure as the pressing mechanism 114 of the Application Example 2 and is configured, as depicted in FIG. 4, of a pressing pad 125a, a pressing pad support member 125b, a biasing member (not depicted in the figure), and a support base (not depicted in the figure). The support base is linked to the pressing pad support member 125b through the biasing member. The pressing pad 125a is attached to the distal end portion of the pressing pad support member 125b. Further, in the pressing mechanism 125, the pressing pad 125a is pushed against the fixing belt 123 from the inner side of the fixing belt 123 by the biasing force of the biasing member, thereby pressing the fixing belt 123 into contact with the pressurizing roll 124. A nip N is thus formed in the color image fixing device 120. Further, as depicted in FIG. 4, where recording paper PP on which an unfixed toner image has been formed is successively fed between the fixing belt 123 and the pressurizing roll 124, the unfixed toner is successively heated and melted by the fixing belt 123 heated by the heater 122a and the pressurizing roll 124 heated by the heater 124a, and the unfixed toner image is fixed on the recording paper PP in the nip N.

In such color image fixing device 120, the present invention can be used for the pressing pad 125a. For example, it is conceivable to provide the low-friction coating layer according to the present invention or to paste the low-friction sheet according to the present invention on the surface of the pressing pad 125a that is to be in contact with the pressurizing roll 124.

(4) Application Example 4

Figure 5:
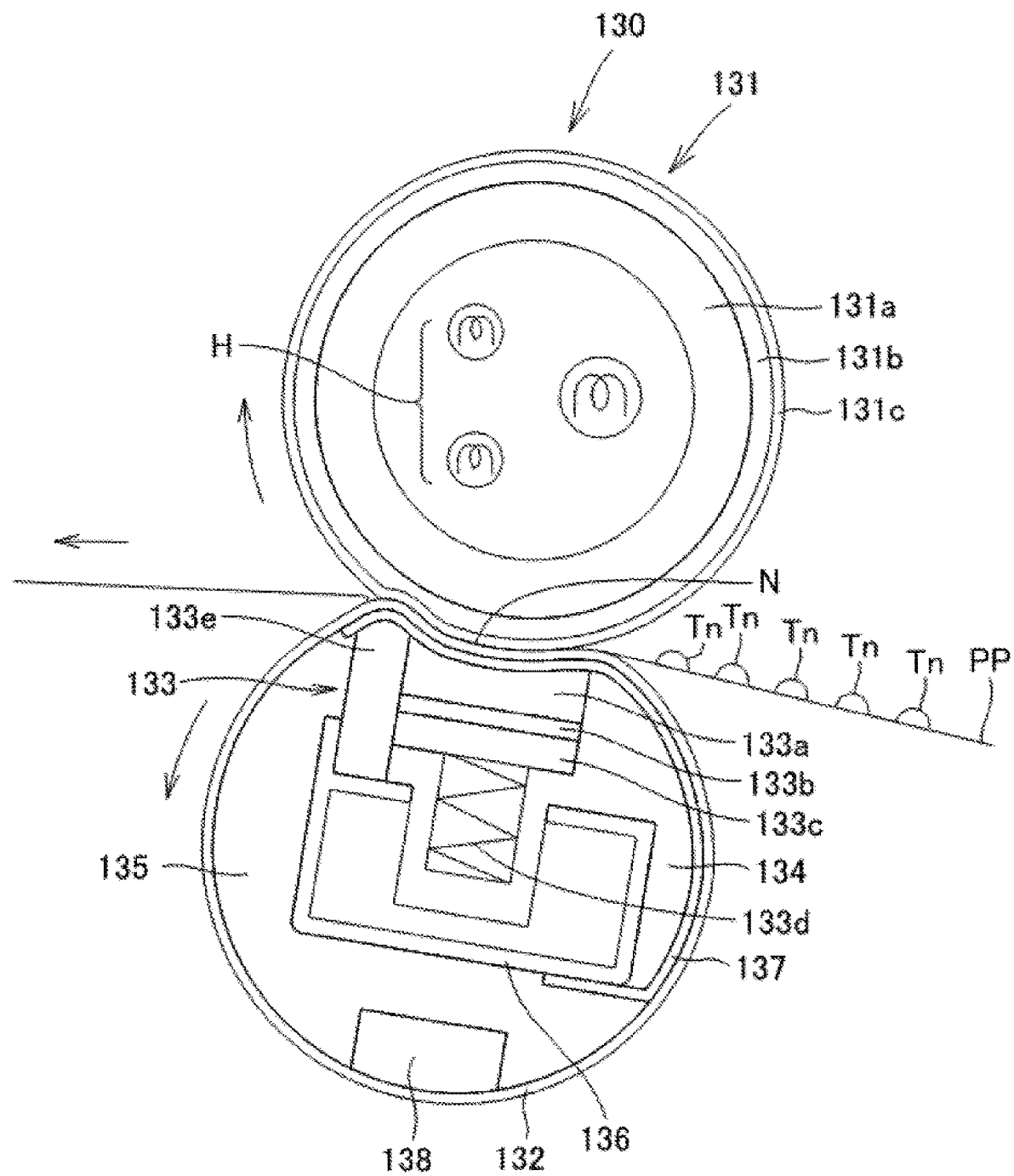
FIG. 5 is a vertical sectional view of a color image fixing device according to Application Example 4 according to the embodiment of the present invention.

The low-friction member according to the embodiment of the present invention can be also applied to a color image fixing device 130 such as depicted in FIG. 5. As depicted in FIG. 5, the color image fixing device 130 is mainly configured of a fixing roll 131, a halogen lamp heater H, a pressurizing belt 132, a pressing mechanism 133, holders 134, 135, a frame 136, a belt guide 137, and an oil pad 138. As depicted in FIG. 5, the fixing roll 131 is mainly configured of a metal core 131a, an elastic layer 131b, and a releasing layer 131c. Further, as depicted in FIG. 5, the halogen lamp heater H is incorporated in the fixing roll 131 in the center thereof. As depicted in FIG. 5, the pressing mechanism 133 is mainly configured of a pressing pad 133a, a base metal plate 133b, a base member 133c, a compression spring 133d, and a separation member 133e. The compression spring 133d is disposed at the rear surface of the base member 133c. The separation member 133e serves to improve the separability of the recording paper PP subjected to fixing from the fixing roll 131 and is held by the holders 134, 135. As depicted in FIG. 5, mainly the pressing pad 133a, the base metal plate 133b, the base member 133c, the compression spring 133d, and the separation member 133e are held by the holder 134. The holders 134, 135 are held by the metal frame 136 disposed in the center. Incidentally, the holder 135 also functions as a guide member for the pressurizing belt 132. As depicted in FIG. 5, the belt guide 137 is disposed between the inner circumferential surface of the pressurizing belt 132 and the pressing pad 133a and also between the inner circumferential surface of the pressurizing belt 132 and the separation member 133e. One end of the belt guide 137 is affixed, as depicted in FIG. 5, to the frame 136. Further, the belt guide 137 is in sliding contact with the inner circumferential surface of the pressurizing belt 132. The oil pad 138 is formed by a sponge or the like, and contains a lubricant such as silicone oil. The oil pad 138 is held by the holder 135 and clamped to the inner circumferential surface of the pressurizing belt 132. Further, in the pressing mechanism 133, the pressing pad 133a is pushed against the belt guide 137 from the inner side of the pressurizing belt 132 by the biasing force of the compression spring 133d, thereby pressing the pressurizing belt 132 into contact with the fixing roll 131. A nip N is thus formed in the color image fixing device 130. Further, as depicted in FIG. 5, where recording paper PP on which an unfixed toner image Tn has been formed is successively fed between the fixing roll 131 and the pressurizing belt 132, the unfixed toner is successively heated and melted by the fixing roll 131 heated by the halogen lamp heater H, and the unfixed toner image Tn is fixed on the recording paper PP in the nip N.

In such color image fixing device 130, the present invention can be used for the belt guide 137. For example, it is conceivable to provide the low-friction coating layer according to the present invention or to paste the low-friction sheet according to the present invention on the outer surface of the belt guide 137, that is, the surface that is to be in contact with the pressurizing belt 132.

(5) Application Example 5

Figure 6:
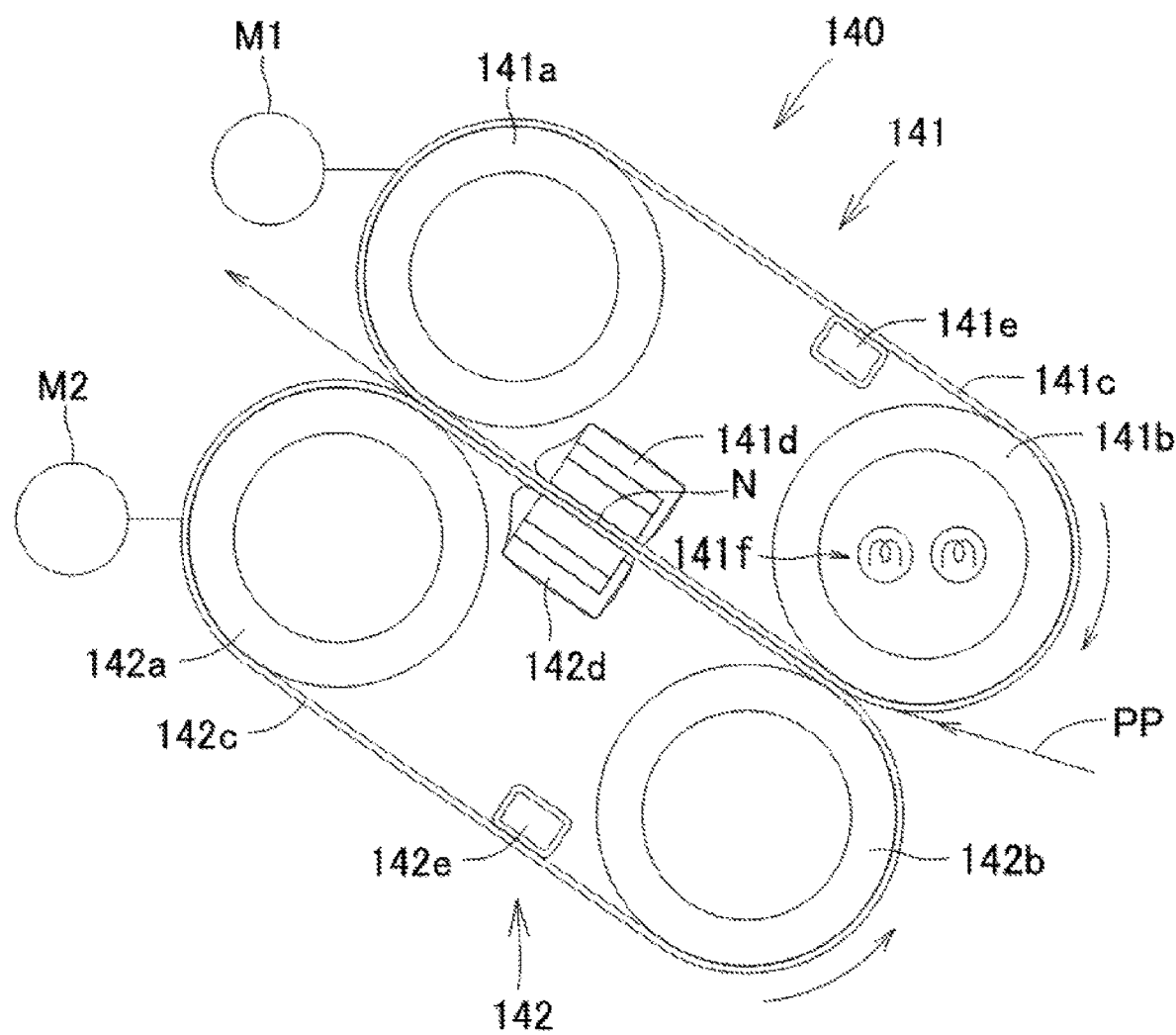
FIG. 6 is a vertical sectional view of a belt type fixing device according to Application Example 5 according to the embodiment of the present invention.

The low-friction member according to the embodiment of the present invention can be also applied to a belt type fixing device 140 such as depicted in FIG. 6. As depicted in FIG. 6, the belt type fixing device 140 is mainly configured of a fixing belt mechanism 141 and a pressurizing belt mechanism 142.

As depicted in FIG. 6, the fixing belt mechanism 141 is mainly configured of a fixing-side drive roll 141a, a motor M1, a fixing-side driven roll 141b, a fixing belt 141c, a fixing-side pressing device 141d, a fixing-side lubricant supply member 141e, and a halogen lamp heater 141f. As depicted in FIG. 6, the fixing-side drive roll 141a is linked to the motor M1 and rotationally driven by the motor M1. As depicted in FIG. 6, the fixing belt 141c is placed over the fixing-side drive roll 141a and the fixing-side driven roll 141b. The fixing-side driven roll 141b is driven by the fixing belt 141c which is driven by the fixing-side drive roll 141a. The fixing-side driven roll 141b incorporates the halogen lamp heater 141f. The fixing-side pressing device 141d has the same mechanism as the pressing mechanism 114 of Application Example 2 and is configured of a pressing pad (not depicted in the figure), a pressing pad support member (not depicted in the figure), a biasing member (not depicted in the figure), and a support base (not depicted in the figure). The support base is linked to the pressing pad support member through the biasing member. Further, the pressing pad is attached to the distal end portion of the pressing pad support member. Further, in the fixing-side pressing device 141d, the pressing pad is pushed against the fixing belt 141c from the inner side of the fixing belt 141c by the biasing force of the biasing member, thereby pressing the fixing belt 141c into contact with the pressurizing belt 142c. The fixing-side lubricant supply member 141e is the same as the oil pad 138 in Application Example 4. This member is formed from a sponge or the like and contains a lubricant such as silicone oil. As depicted in FIG. 6, the fixing-side lubricant supply member 141e is clamped to the inner circumferential surface of the fixing belt 141c.

As depicted in FIG. 6, the pressurizing belt mechanism 142 is mainly configured of a pressurizing-side drive roll 142a, a motor M2, a pressurizing-side driven roll 142b, a pressurizing belt 142c, a pressurizing-side pressing device 142d, and a pressurizing-side lubricant supply member 142e. As depicted in FIG. 6, the pressurizing-side drive roll 142a is linked to the motor M2 and rotationally driven by the motor M2. Incidentally, as depicted in FIG. 6, the pressurizing-side drive roll 142a is disposed adjacently to the fixing-side drive roll 141a. As depicted in FIG. 6, the pressurizing belt 142c is placed over the pressurizing-side drive roll 142a and the pressurizing-side driven roll 142b. Further, as depicted in FIG. 6, the pressurizing belt 142c is disposed to be partially adjacent to the fixing belt 141c. The pressurizing-side driven roll 142b is driven by the pressurizing belt 142c which is driven by the pressurizing-side drive roll 142a. The pressurizing-side pressing device 142d has the same mechanism as the pressing mechanism 114 of Application Example 2 and is configured of a pressing pad (not depicted in the figure), a pressing pad support member (not depicted in the figure), a biasing member (not depicted in the figure), and a support base (not depicted in the figure). The support base is linked to the pressing pad support member through the biasing member. The pressing pad is attached to the distal end portion of the pressing pad support member. In the pressurizing-side pressing device 142d, the pressing pad is pushed against the pressurizing belt 142c from the inner side of the pressurizing belt 142c by the biasing force of the biasing member, thereby pressing the pressurizing belt 142c into contact with the fixing belt 141c. Further, as depicted in FIG. 6, the pressurizing-side pressing device 142d is disposed opposite the fixing-side pressing device 141d. Therefore, it can be said that the pressurizing-side pressing device 142d together with the fixing-side pressing device 141d press the pressurizing belt 142c and the fixing belt 141c into contact with each other. A nip N is thus formed in the belt type fixing device 140. The pressurizing-side lubricant supply member 142e is the same as the oil pad 138 of Application Example 4. This member is formed from a sponge or the like and contains a lubricant such as silicone oil. As depicted in FIG. 6, the pressurizing-side lubricant supply member 142e is clamped to the inner circumferential surface of the pressurizing belt 142c.

Further, as depicted in FIG. 6, where recording paper PP on which an unfixed toner image has been formed is successively fed between the fixing belt 141c and the pressurizing belt 142c, the unfixed toner is successively heated and melted by the fixing-side driven roll 141b heated by the halogen lamp heater H, and the unfixed toner image is fixed on the recording paper PP in the nip N.

In such belt type fixing device 140, the present invention can be used for the pressing pads of the fixing-side pressing device 141d and the pressurizing-side pressing device 142d. For example, it is conceivable to provide the low-friction coating layer according to the present invention or to paste the low-friction sheet according to the present invention on the surface of the pressing pad that is to be in contact with the fixing belt 141c or the surface of the pressing pad that is to be in contact with the pressurizing belt 142c.

(6) Application Example 6

Figure 7:
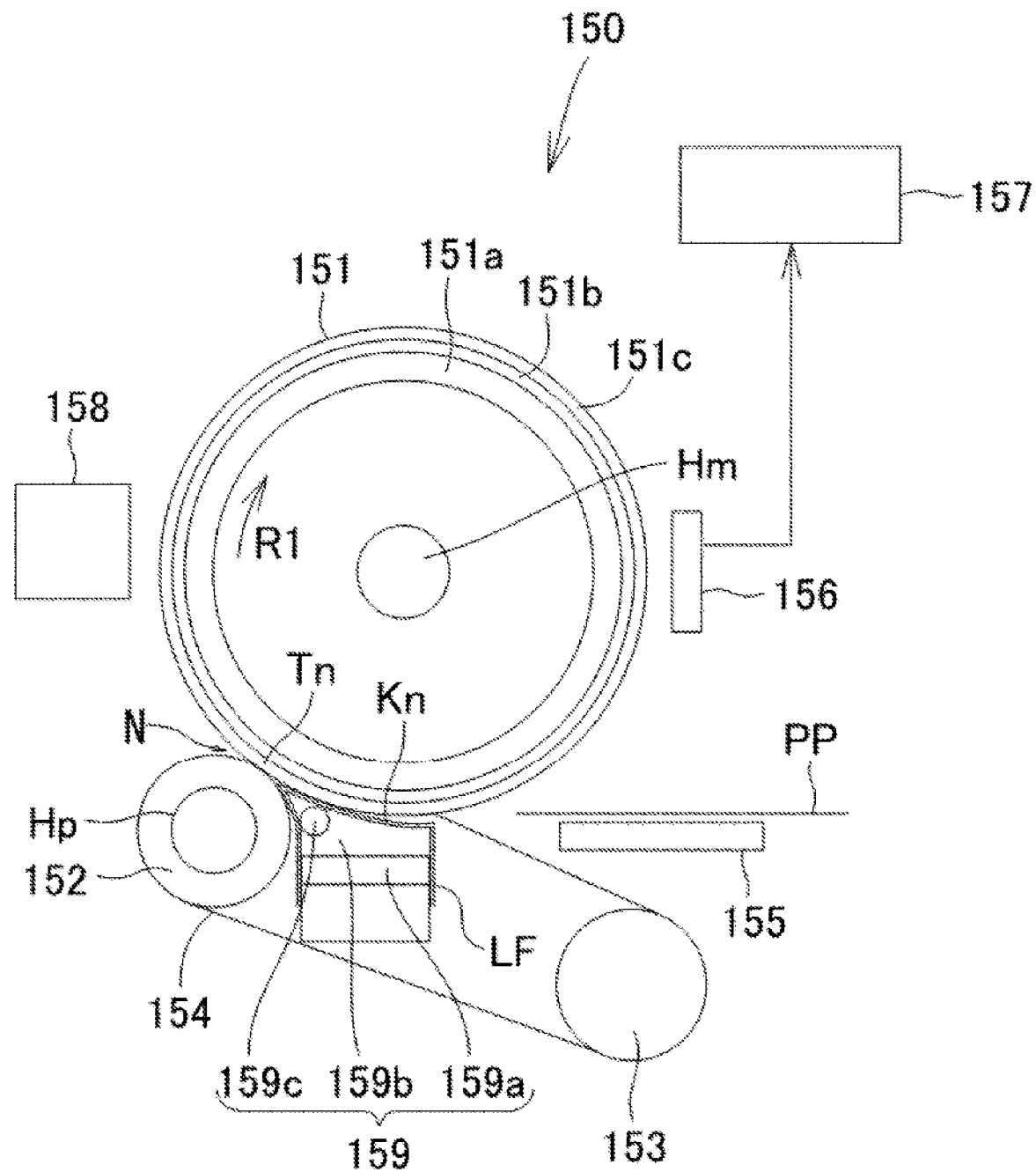
FIG. 7 is a vertical sectional view of a belt type fixing device according to Application Example 6 according to the embodiment of the present invention.

The low-friction member according to the embodiment of the present invention can be also applied to a belt type fixing device 150 such as depicted in FIG. 7. As depicted in FIG. 7, the belt type fixing device 150 is mainly configured of a fixing roll 151, a halogen lamp heater Hm, a pressurizing roll 152, a halogen lamp heater Hp, a steering roll 153, a pressurizing belt 154, a guide 155, a temperature sensor 156, a temperature adjustment circuit 157, a gear mechanism 158, a pressurizing pad 159, and a low-friction sheet LF. As depicted in FIG. 7, in the fixing roll 151, an elastic layer 151b made from a silicone rubber is provided on the surface of a metallic core 151a from an aluminum cylindrical pipe, and a heat-resistant releasing layer 151c from a fluororesin is provided on the surface of the elastic layer 151b. Further, as depicted in FIG. 7, the fixing roll 151 incorporates the halogen lamp heater Hm. As depicted in FIG. 7, the temperature sensor 156 is provided so as to face the fixing roll 151. The temperature sensor 156 detects the surface temperature of the fixing roll 151. Further, as depicted in FIG. 7, the temperature sensor 156 is connected to the temperature adjustment circuit 157. The temperature adjustment circuit 157 performs ON-OFF control of the halogen lamp heater Hm by feedback of the output of the temperature sensor 156, thereby controlling the surface temperature of the fixing toll 151 to a fixed range. The gear mechanism 158 rotates the pressurizing belt 154 at a speed equal to the rotation speed of the fixing roll 151 by rotationally driving the fixing roll 151 integrally with the pressurizing roll 152. As depicted in FIG. 7, the pressurizing roll 152 incorporates the halogen lamp heater Hp. A temperature sensor (not depicted in the figure) is provided in the vicinity of the surface of the pressurizing roll 152. This temperature sensor detects the surface temperature of the pressurizing roll 152. This temperature sensor is also connected to the temperature adjustment circuit 157. The temperature adjustment circuit 157 performs ON-OFF control of the halogen lamp heater Hp by feedback of the output of the temperature sensor, thereby controlling the surface temperature of the pressurizing roll 152 to a fixed range. The steering roll 153 has a belt steering function and a function of applying a belt tension to the pressurizing belt 154 and ensures stable circulatory rotation of the pressurizing belt 154 at a constant position in the width direction. As depicted in FIG. 7, the pressurizing belt 154 is passed over the pressurizing roll 152 and the steering roll 153. The two end portions of the pressurizing roll 152 are biased toward the fixing roll 151 by a spring mechanism (not depicted in the figure), and the pressurizing roll pinches, cooperatively with the fixing roll 151, the pressurizing belt 154. Thus, as depicted in FIG. 7, the fixing roll 151 is pressed into contact with the pressurizing belt 154. As a result, a nip N is formed between the pressurizing belt 154 and the fixing roll 151. Further, in the belt type fixing device 150, the recording paper PP received from the guide 155 passes via a heating region Kn and through the nip N, while being sandwiched and conveyed by the fixing roll 151 and the pressurizing belt 154. When the recording paper PP passes through the nip N, a toner image is fixed to the recording paper PP. As depicted in FIG. 7, the pressurizing pad 159 is inserted in a gap between the pressurizing roll 152 and the pressurizing belt 154 in the vicinity of the nip N. The pressurizing pad 159 is configured by adhesively bonding an elastic layer 159b onto a support plate 159a. In order to prevent the generation of a non-pressurized portion in the heating region Kn, a metal rod 159c is provided by being integrally embedded in the distal end portion of the elastic layer 159b of the pressurizing pad 159 which has been advanced into the gap between the pressurizing belt 154 and the pressurizing roll 152. As depicted in FIG. 7, the low-friction sheet LF is folded back by the portion of the rod 159c of the pressurizing pad 159 and covers continuously the surface pressed against the fixing roll 151 and the surface that is in contact with the pressurizing roll 152. The distal end of the folded portion of the low-friction sheet LF is disposed to be advanced, in an acute angular shape, toward the pressurized portion of the fixing roll 151 created by the pressurizing roll 152.

In the belt type fixing device 150, the present invention can be used for the low-friction sheet LF.

(7) Application Example 7

Figure 8:
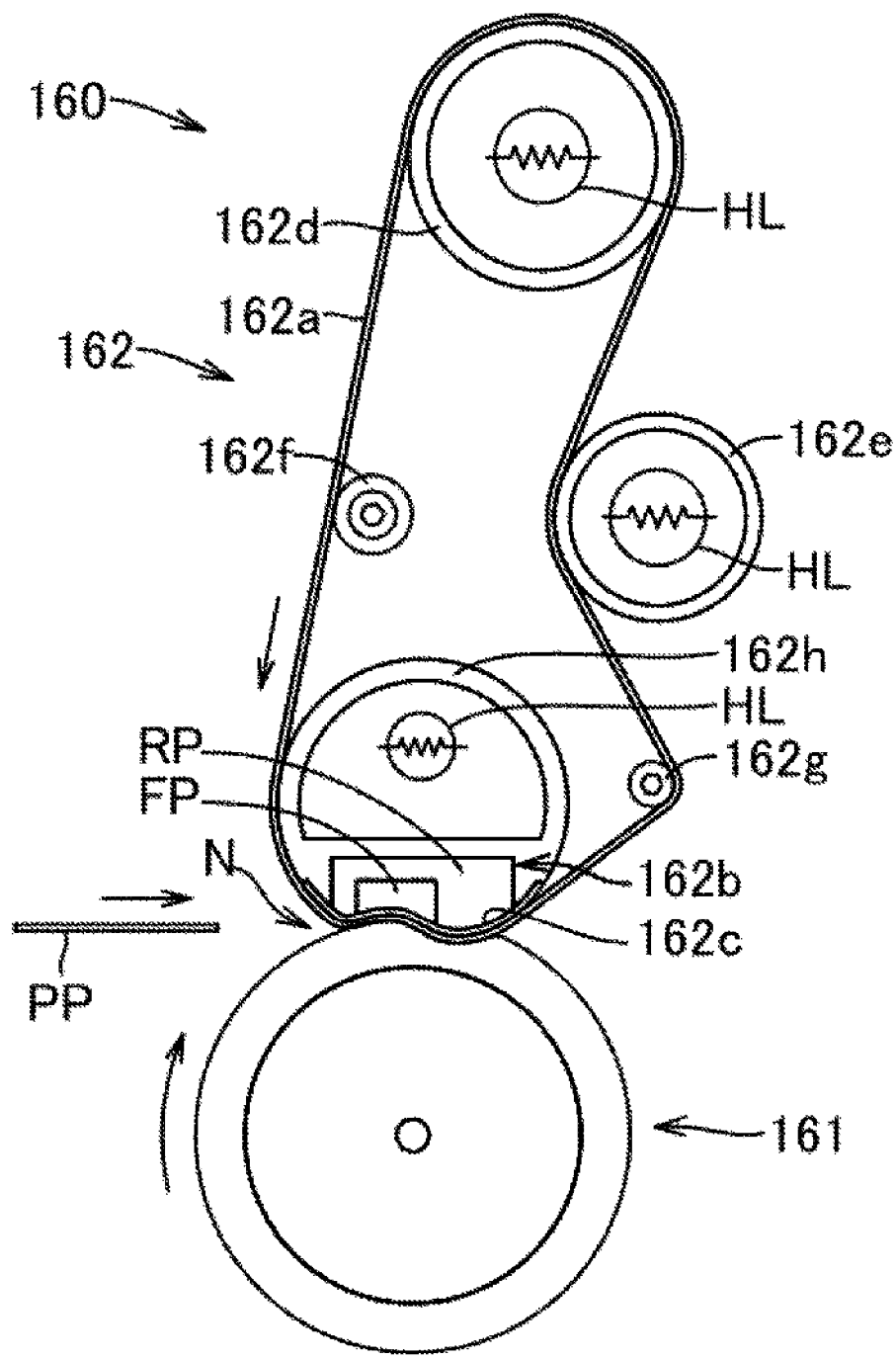
FIG. 8 is a vertical sectional view of a fixing belt type fixing device according to Application Example 7 according to the embodiment of the present invention.

The low-friction member according to the embodiment of the present invention can be also applied to a fixing belt type fixing device 160 such as depicted in FIG. 8. As depicted in FIG. 8, the fixing belt type fixing device 160 is mainly configured of a pressurizing roll 161 and a fixing belt module 162. The fixing belt module 162 includes a fixing belt 162a, a pressing pad 162b, a belt guide 162c, a halogen lamp heater HL, a drive support roll 162d, a driven support roll 162e, a posture correction roll 162f, an auxiliary roll 162g, and a holding member 162h. As depicted in FIG. 8, the pressurizing roll 161 is disposed such as to apply pressure to the fixing belt 162a. A nip N is formed in a region where the pressurizing roll 161 and the fixing belt 162a are in contact with each other. The fixing belt 162a is formed as an endless belt and supported rotatably by the pressing pad 162b and the drive support roll 162d disposed inside thereof. The pressing pad 162b is provided with a front pinching member FP and a peeling pinching member RP and is supported by a holding member 162h. The front pinching member FP is configured to be concaved according to the outer circumferential shape of the pressurizing roll 161 and disposed on the inlet side of the nip N. Further, the front pinching member FP also serves to ensure the length of the nip N. The peeling pinching member RP is configured to protrude with respect to the outer circumferential surface of the pressurizing roll 161 and disposed on the outlet side of the nip N. The peeling pinching member RP generates local strains in the pressurizing roll 161 in the outlet region of the nip N and serves to facilitate the peeling of the recording paper PP after fixing from the pressurizing roll 161. The pressing pad 162b presses the fixing belt 162a through the belt guide 162c against the pressurizing roll 161. Further, the halogen lamp heater HL is provided in the vicinity of the pressing pad 162b. The halogen lamp heater HL heats the fixing belt 162a from the inner circumferential surface side. The belt guide 162c is the so-called low-friction sheet and disposed between the fixing belt 162a and the pressing pad 162b. The fixing belt 162a is placed over the drive support roll 162d. Further, the drive support roll 162d supports the fixing belt 162a at a position different from that of the pressing pad 162b. The drive support roll 162d also incorporates the halogen lamp heater HL and heats the fixing belt 162a from the inner side thereof. The driven support roll 162e is disposed to be in contact with the outer circumferential surface of the fixing belt 162a in a range from the pressing pad 162b to the drive support roll 162d and defines the orbiting path of the fixing belt 162a. The driven support roll 162e also incorporates the halogen lamp heater HL and heats the fixing belt 162a from the outside. The posture correction roll 162f is, for example, an aluminum cylindrical roll and disposed in contact with the inner circumferential surface of the fixing belt 162a between the drive support roll 162d and the pressing pad 162b. The posture correction roll corrects the posture of the fixing belt 162a in a range from the drive support roll 162d to the pressing pad 162b. An end portion position measuring mechanism (not depicted in the figure) that measures the position of the end portion of the fixing belt 162a is disposed in the vicinity of the posture correction roll 162f. The posture correction roll 162f is provided with an axial displacement mechanism (not depicted in the figure) that displaces the axial abutment position of the fixing belt 162a according to the measurement result of the end portion position measuring mechanism. These mechanisms correct the posture of the fixing belt 162a. The auxiliary roll 162g is disposed in contact with the inner circumferential surface of the fixing belt 162a in a range from the pressing pad 162b to the driven support roll 162e and applies tension to the fixing belt 162a from the inner circumferential surface of the fixing belt 162a downstream of the nip N.

(8) Application Example 8

Figure 9:
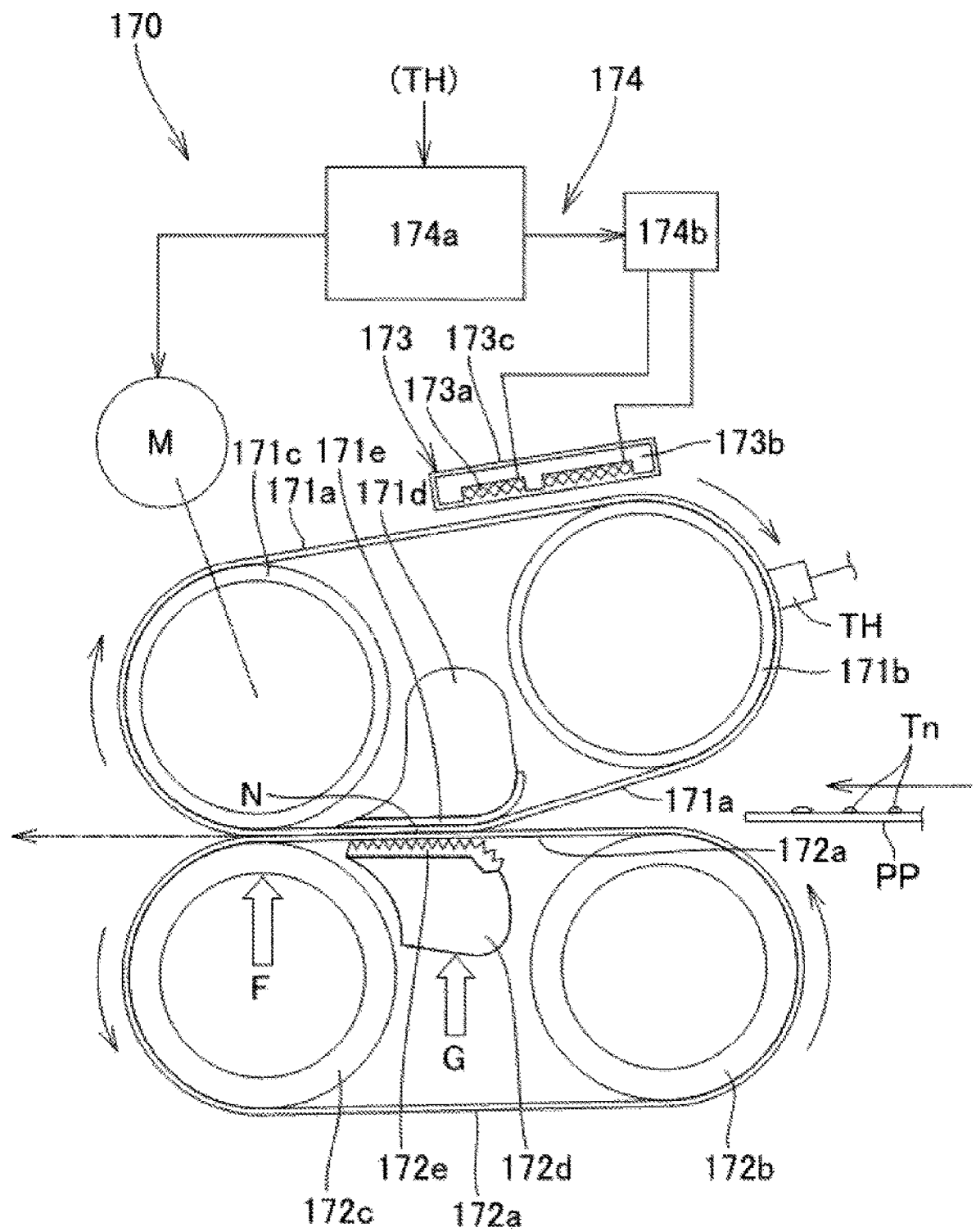
FIG. 9 is a vertical sectional view of a belt type fixing device according to Application Example 8 according to the embodiment of the present invention.

The low-friction member according to the embodiment of the present invention can be also applied to a belt type fixing device 170 such as depicted in FIG. 9. As depicted in FIG. 9, the belt type fixing device 170 is mainly configured of a fixing belt mechanism 171, a pressurizing belt mechanism 172, an induction heating device 173, and a control device 174.

As depicted in FIG. 9, the fixing belt mechanism 171 is mainly configured of a fixing belt 171a, a heating roll 171b, a fixing roll 171c, a motor M, a fixing pad 171d, and a low-friction sheet 171e. The fixing belt 171a is an endless strip-shaped body composed of three layers, namely, a base layer, an elastic layer, and a releasing layer. As depicted in FIG. 9, the fixing belt is tensioned over the heating roll 171b and the fixing roll 171c. The base layer of the fixing belt 171a is formed from a metal such as a SUS alloy, nickel, iron, magnetic stainless steel, and a cobalt-nickel alloy to enable induction heating. The heating roll 171b is an iron hollow roll that is rotatably journaled between left and right side plates of the belt type fixing device 170. The heating roll 171b also functions as a tension roll for applying tension to the fixing belt 171a. The fixing roll 171c is an elastic roll with high sliding ability in which a silicone rubber layer is provided as an elastic layer on a core from an iron alloy. Similarly to the heating roll 171b, the fixing roll is rotatably journaled between left and right side plates of the belt type fixing device 170. The fixing roll 171c serving as a drive roll is rotationally driven at a prescribed speed in a clockwise direction, which is indicated by an arrow, as a result of inputting a drive force from the motor M through a drive gear train (not depicted in the figure). Where the fixing roll 171c is rotationally driven, the fixing belt 171a rotates together with the fixing roll 171c due to friction between the silicone rubber surface of the fixing roll 171c and the polyimide layer on the inner side of the fixing belt 171a. The fixing pad 171d is a member for pressing the fixing belt 171a against the pressurizing belt 172a. The fixing pad is supported between the left and right side plates of the belt type fixing device 170. As depicted in FIG. 9, the low-friction sheet 171e is provided between the fixing pad 171d and the inner circumferential surface of the fixing belt 171a.

As depicted in FIG. 9, the pressurizing belt mechanism 172 is mainly configured of a pressurizing belt 172a, a tension roll 172b, a pressurizing roll 172c, a pressurizing pad 172d, and a low-friction sheet 172e. The pressurizing belt 172a has the same structure as the fixing belt 171a and, as depicted in FIG. 9, is tensioned by the tension roll 172b and the pressurizing roll 172c. The pressurizing belt 172a is rotated by the fixing belt 171a. In the tension roll 172b, a silicone sponge layer is provided on a core from an iron alloy. The tension roll is rotatably journaled between the left and right side plates of the belt type fixing device 170. The pressurizing roll 172c is a rigid low-sliding roll made from an iron alloy and is rotatably journaled between the left and right side plates of the belt type fixing device 170. Further, in the pressurizing roll 172c, the left and right end sides in the direction of axis of rotation are pressed against the fixing roll 171c (see arrow F) by a pressurizing mechanism (not depicted in the figure). As a result, a nip N is formed between the fixing belt 171a and the pressurizing belt 172a. Further, as depicted in FIG. 9, where recording paper PP on which an unfixed toner image Tn has been formed is successively fed between the fixing belt 171a and the pressurizing belt 172a, the unfixed toner is successively heated and melted by the heated fixing belt 171a, and the unfixed toner image Tn is fixed on the recording paper in the nip N (in FIG. 2, the reference symbol Th denotes the fixed toner image). The pressurizing pad 172d is a member for pressing the pressurizing belt 172a against the fixing belt 171a. The pressurizing pad is supported between the right and left side plates of the belt type fixing device 170. The pressurizing pad 172d is also pressed by the pressurizing mechanism (not depicted in the figure) against the fixing pad 171d (see arrow G). As a result a wide nip N is obtained in the belt type fixing device 170. As depicted in FIG. 9, the low-friction sheet 172e is provided between the pressurizing pad 172d and the inner circumferential surface of the pressurizing belt 172a.

As depicted in FIG. 9, the induction heating device 173 is mainly configured of an induction coil 173a, an excitation core 173b, and a coil holder 173c. The induction coil 173a is obtained by flat-winding elliptically a litz wire. The induction coil is disposed inside the excitation core 173b. The excitation core 173b is formed from a material with a low residual magnetic flux density and a high magnetic permeability, such as a ferrite and a permalloy. The coil holder 173c holds the induction coil 173a and the excitation core 173b.

As depicted in FIG. 9, the control device 174 is mainly configured of a control circuit portion 174a, an excitation circuit 174b, and a temperature detection element TH. As depicted in FIG. 9, the control circuit portion 174a is connected to the motor M and drives the motor M when image formation is executed. Where the motor M is driven, the fixing roll 171c is rotationally driven. As a result, the fixing belt 171a is rotationally driven in the same direction. Incidentally, the peripheral speed of the fixing belt 171a is slightly lower than the conveying speed of the recording paper PP. The control circuit portion 174a also controls power supplied from the excitation circuit 174b to the induction coil 173a so as to maintain a constant surface temperature of the fixing belt 171a. Where the excitation circuit 174b receives power supply, the excitation circuit causes a high-frequency current corresponding to the power amount at that time to flow in the induction coil 173a of the induction heating device 173. Where the high-frequency current is thus caused to flow in the induction coil 173a of the induction heating device 173, the base layer of the fixing belt 171a inductively generates heat and the fixing belt 171a is heated. The temperature detection element TH is, for example, a thermistor and detects the surface temperature of the fixing belt 171a. A signal relating to the surface temperature of the fixing belt 171a which is detected by the temperature detection element TH is inputted to the control circuit portion 174a. The control circuit portion 174a controls, on the basis of this signal, the power supplied from the excitation circuit 174b to the induction coil 173a.

In the belt type fixing device 170, the present invention can be used for the low-friction sheets 171e, 172e, the fixing pad 171d, or the pressurizing pad 172d. Incidentally, when the present invention is used for the fixing pad 171d or the pressurizing pad 172d, the low-friction sheets 171e, 172e may be omitted. In this case, it is conceivable to provide the low-friction coating layer according to the present invention or to paste the low-friction sheet according to the present invention on the surface of the fixing pad 171d that is to be in contact with the fixing belt 171a, and to provide the low-friction coating layer according to the present invention or to paste the low-friction sheet according to the present invention on the surface of the pressurizing pad 172d that is to be in contact with the pressurizing belt 172a.

(9) Application Example 9

Figure 10:
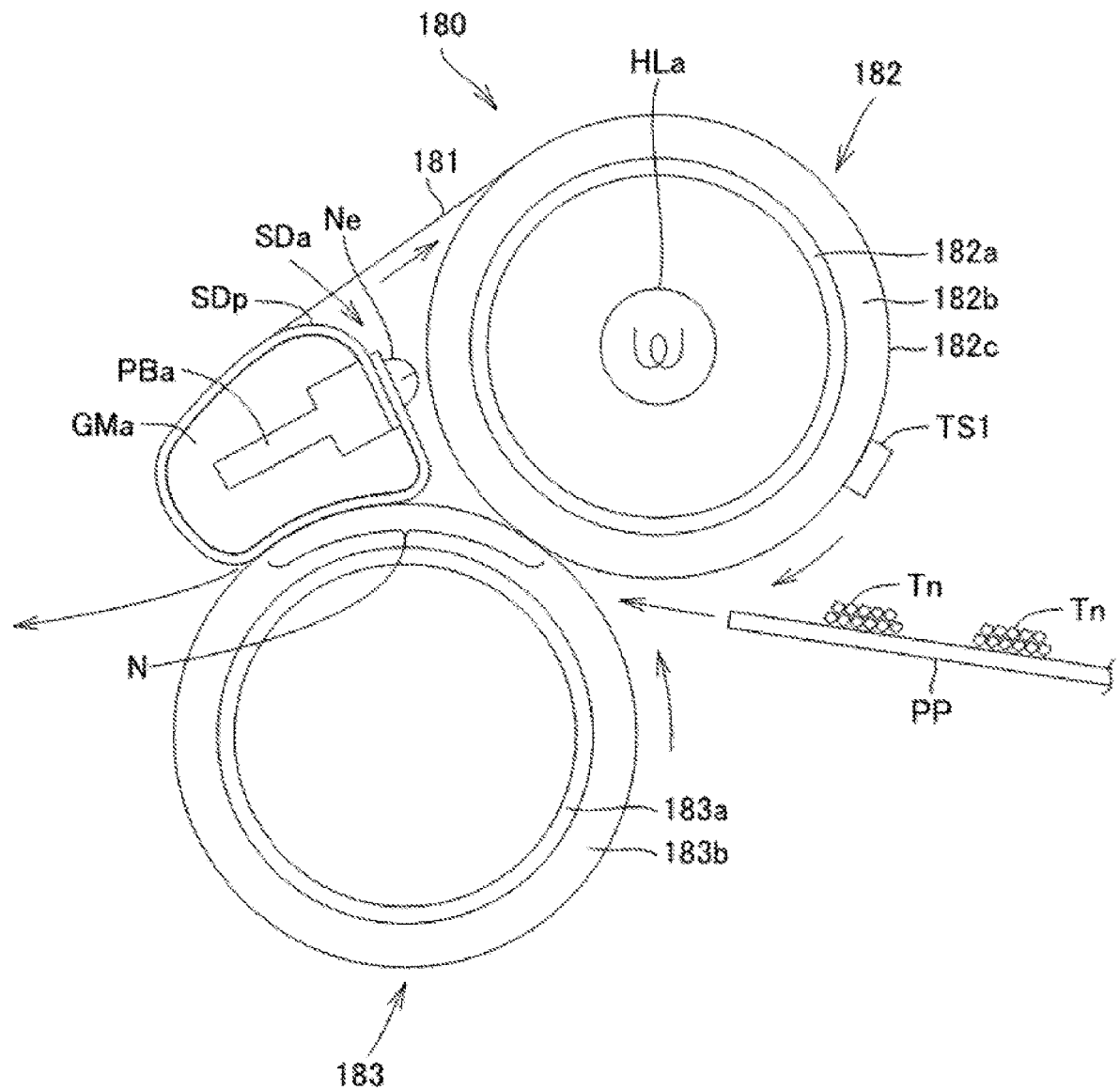
FIG. 10 is a vertical sectional view of a color image fixing device according to Application Example 9 according to the embodiment of the present invention.

The low-friction member according to the embodiment of the present invention can be also applied to a color image fixing device 180 such as depicted in FIG. 10. As depicted in FIG. 10, the color image fixing device 180 is mainly configured of a fixing belt 181, a halogen lamp heater HLa, a tensioning roll 182, a belt guide SDa, a pressurizing roll 183, and a temperature sensor TS1. The fixing belt 181 is an endless strip-shaped body composed of three layers, namely, a base layer, an elastic layer, and a releasing layer. As depicted in FIG. 10, the fixing belt is tensioned by the tensioning roll 182 and the belt guide SDa. As depicted in FIG. 10, the tensioning roll 182 is mainly configured of three layers, namely, a cylindrical metal pipe 182a, a rubber roll layer 182b, and a releasing layer 182c. Further, the tensioning roll 182 incorporates the halogen lamp heater HLa. As depicted in FIG. 10, the belt guide SDa is mainly configured of a support body PBa, a rubber member GMa, and a low-friction sheet SDp. The support body PBa is a block body of a substantially rectangular parallelepiped shape. The rubber member GMa is provided so as to cover the support body PBa. The low-friction sheet SDp is wound around the rubber member GMa and screwed in this state to the support body PBa with a screw Ne. As depicted in FIG. 10, the pressurizing roll 183 is the so-called semi-hard roll composed of two layers, namely, a metal pipe 183a and a rubber roll layer 183b. The pressurizing roll is pressed through the fixing belt 181 against the tensioning roll 182 and the belt guide SDa. As a result, a nip N is formed between the tensioning roll 182 and belt guide SDa, on one side, and the pressurizing roll 183, on the other side. Further, as depicted in FIG. 10, where recording paper PP on which an unfixed toner image Tn has been formed is successively fed between the fixing belt 181 and the pressurizing roll 183, the unfixed toner is successively heated and melted by the fixing belt 181 heated by the halogen lamp heater HLa, and the unfixed toner image Tn is fixed on the recording paper in the nip N. The temperature sensor TS1 is provided adjacently to the tensioning roll 182 and transmits temperature information to a control device (not depicted in the figure). Further, the control device controls, on the basis of this temperature information, the power supplied to the halogen lamp heater HLa and adjusts the heating temperature thereof.

In the color image fixing device 180, the present invention can be used for the low-friction sheet SDp. Further, the same effect can be also received by providing the low-friction coating layer according to the present invention on the surface of the rubber member GMa.

(10) Application Example 10

Figure 11:
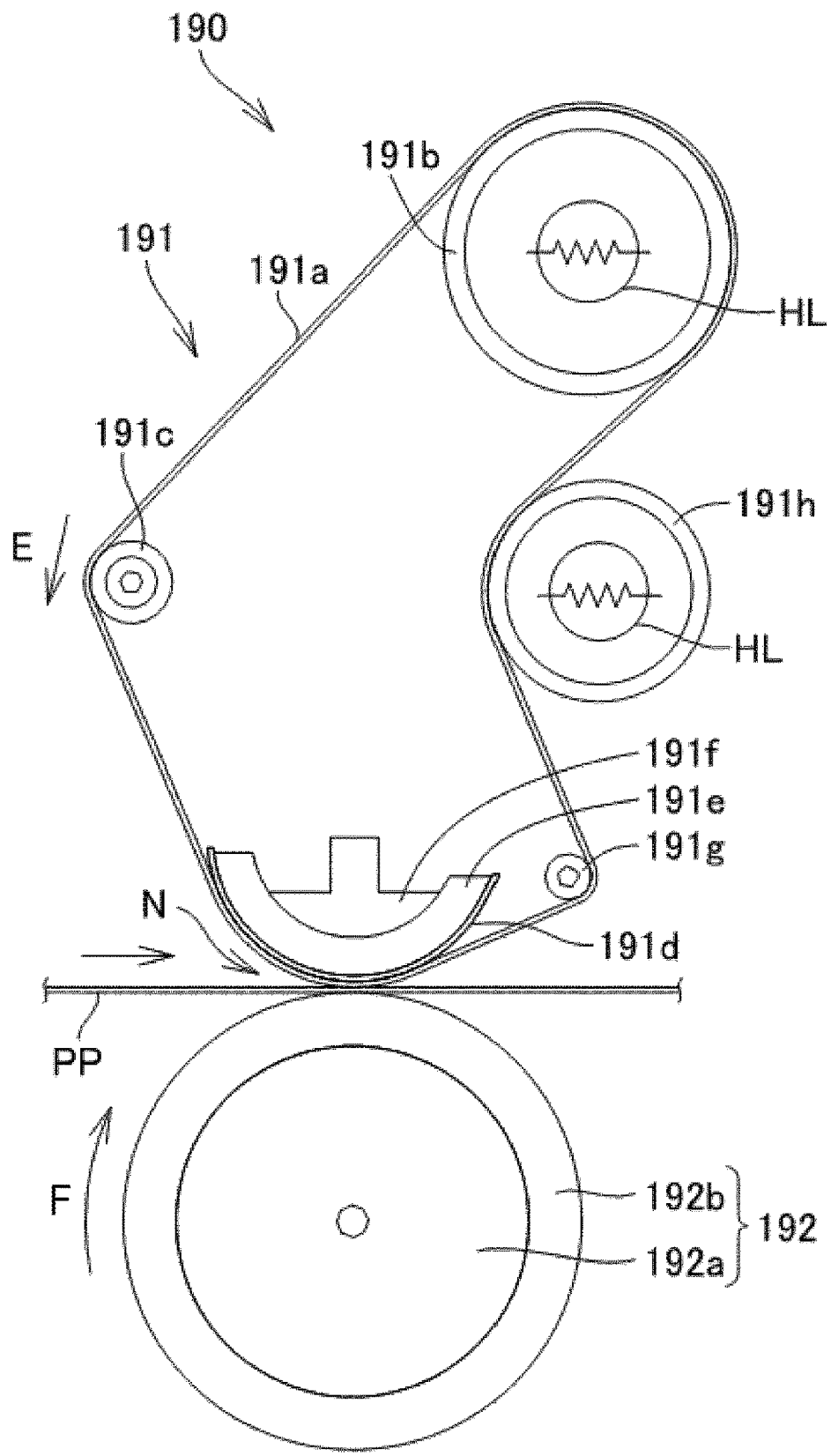
FIG. 11 is a vertical sectional view of a fixing belt type fixing device according to Application Example 10 according to the embodiment of the present invention.

The low-friction member according to the embodiment of the present invention can be also applied to a fixing belt type fixing device 190 such as depicted in FIG. 11. As depicted in FIG. 11, the fixing belt type fixing device 190 is mainly configured of a fixing belt module 191 and a pressurizing roll 192. As depicted in FIG. 11, the fixing belt module 191 is mainly configured of a fixing belt 191a, a drive support roll 191b, a posture correction roll 191c, a low-friction sheet 191d, a pressing pad 191e, a holding member 191f, an auxiliary roll 191g, a driven support roll 191h, and a halogen lamp heater HL. The fixing belt 191a is formed as an endless belt and supported rotatably by the drive support roll 191b, the posture correction roll 191c, the pressing pad 191e, and the auxiliary roll 191g disposed inside thereof. The drive support roll 191b is rotationally driven by a motor (not depicted in the figure) and presses the fixing belt 191a to the outside by biasing members provided at both ends of the drive support roll. Further, as depicted in FIG. 11, the drive support roll 191b incorporates the halogen lamp heater HL. The fixing belt 191a is heated from the inner side with the halogen lamp heater HL. The posture correction roll 191c serves to control the meandering of the fixing belt 191a. An end portion position measuring mechanism (not depicted in the figure) that measures the position of the end portion of the fixing belt 191a is disposed in the vicinity of the posture correction roll 191c. Further, the posture correction roll 191c is provided, for example, with an axial displacement mechanism (not depicted in the figure) that displaces the axial abutment position of the fixing belt 191a according to the measurement result of the end portion position measuring mechanism. As depicted in FIG. 11, the pressing pad 191e presses the fixing belt 191a from the inner surface thereof against the pressurizing roll 192. The low-friction sheet 191d is affixed, as depicted in FIG. 11, by an affixing member (not depicted in the FIG. 10 the pressing pad 191e. As a result, the low-friction sheet 191d is provided between the fixing belt 191a and the pressing pad 191e. The holding member 191f holds the pressing pad 191e. Similarly to the drive support roll 191b, the driven support roll 191h incorporates the halogen lamp heater HL. The fixing belt 191a is heated from the outside by the halogen lamp heater HL. The pressurizing roll 192 is composed, for example, of three layers, namely, a metal roll 192a, an elastic layer 192b, and a releasing layer (not depicted in the figure) and supported rotatably. Further, the pressurizing roll 192 is pressed by a biasing means (not depicted in the figure) such as a spring against a region where the fixing belt 191a is wound around the pressing pad 191e. As a result, a nip N is formed by the fixing belt 191a and the pressurizing roll 192. In this nip N, recording paper PP is pressurized and also heated and a toner image (not depicted in the figure) is fixed. Therefore, as the fixing belt 191a moves in the direction of arrow E, the pressurizing roll 192 is driven by the fixing belt 191a and rotates in the direction of arrow F.

In the fixing belt type fixing device 190, the present invention can be used for the low-friction sheet 191d. Further, the same effect can be also received by providing the low-friction coating layer according to the present invention on the surface of the pressing pad 191e.

(11) Application Example 11

Figure 12:
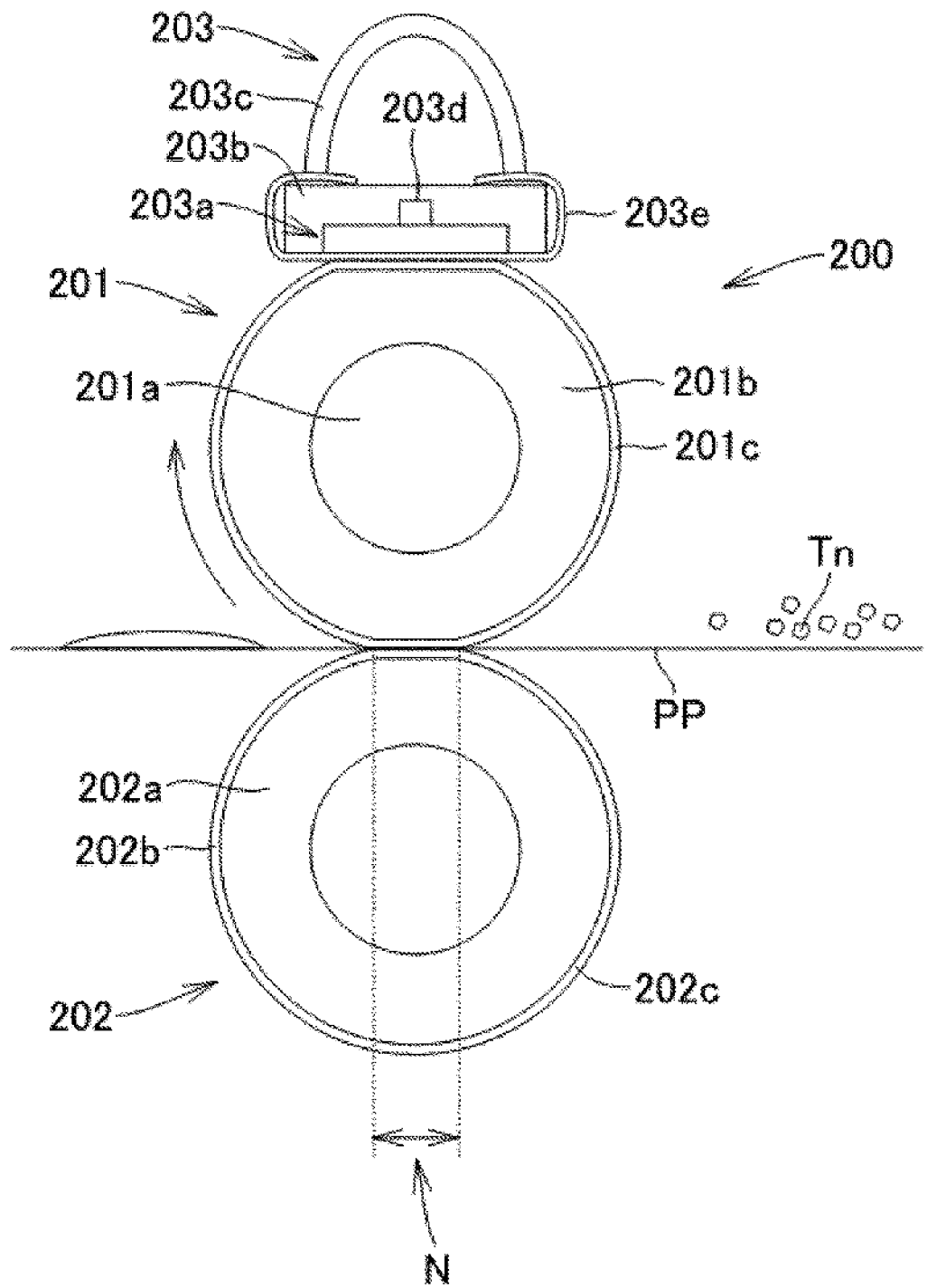
FIG. 12 is a vertical sectional view of a fixing roll type fixing device according to Application Example 11 according to the embodiment of the present invention.

The low-friction member according to the embodiment of the present invention can be also applied to a fixing roll type fixing device 200 such as depicted in FIG. 12. As depicted in FIG. 12, the fixing roll type fixing device 200 is mainly configured of a fixing roll 201, a pressurizing roll 202, and an external heating device 203. The fixing roll 201 is composed of three layers, namely, a stainless steel core 201a, an elastic layer 201b, and a releasing layer 201c. The pressurizing roll 202 is composed of three layers, namely, a stainless steel core 202a, an elastic layer 202b, and a releasing layer 202c. The pressurizing roll is provided such that the axis thereof is parallel to that of the fixing roll 201, and the pressurizing roll is pressed into contact with the fixing roll 201. Therefore, a nip N is formed between the fixing roll 201 and the pressurizing roll 202. Further, where recording paper PP carrying an unfixed toner image Tn is introduced into the nip N, the unfixed toner image Tn is fixed to the recording paper PP. As depicted in FIG. 12, the external heating device 203 is mainly configured of a ceramic heater 203a, a thermally insulating stay holder 203b, a metal stay 203c, a temperature detection element 203d, and a low-friction sheet 203e. The external heating device heats the fixing roll 201 from the surface side. The ceramic heater 203a is a well-known ceramic heater. The thermally insulating stay holder 203b thermally insulates the ceramic heater 203a and supports the posture thereof. The metal stay 203c backs up the thermally insulating stay holder 203b. The temperature detection element 203d is provided on the surface of the ceramic heater 203a opposite that on the fixing roll side. The low-friction sheet 203e is provided, as depicted in FIG. 12, between the fixing roll 201 and the ceramic heater 203a. Incidentally, the low-friction sheet 203e is provided such as to envelope the thermally insulating stay holder 203b and is affixed to the thermally insulating stay holder 203b by the metal stay 203c.

In the fixing roll type fixing device 200, the present invention can be used for the low-friction sheet 203e. Further, the same effect can be also received by providing the low-friction coating layer according to the present invention on the bottom surface of the ceramic heater 203a.

Examples and Comparative Examples

The present invention will be specifically explained hereinbelow by using examples and comparative examples. The examples merely illustrate examples of the present invention, and the present invention is not limited to these examples.

Example 1

1. Production of Low-Friction Sheet
(1) Preparation of Polyimide Precursor Solution A polyimide precursor solution was obtained by reacting 100 g of 3,3',4,4'-biphenyltetracarboxylic acid dianhydride (BPDA) with 39 g of paraphenylenediamine (PPD) in 630 g of N-methyl-2-pyrrolidone (NMP).

(2) Preparation of Polyimide Precursor Solution Containing Fluororesin Particles of Different Diameters The content of solids in the obtained polyimide precursor solution was 18.1 mass %. A polyimide precursor solution containing fluororesin particles of different diameters was then obtained by adding a polytetrafluoroethylene (abbreviated hereinbelow as "PTFE") powder with a median diameter of 40.0 μm and a PTFE powder with a median diameter of 0.3 μm to the polyimide precursor solution so as to obtain the content of the powders in the finally obtained low-friction sheet of 30 mass % (22 vol %) and 45 mass % (30 vol %), respectively, and then thoroughly stirring the polyimide precursor solution including the PTFE powders to disperse the two PTFE powders in the polyimide precursor solution.

(3) Production of Low-Friction Sheet

The above-described polyimide precursor solution containing fluororesin particles of different diameters was coated by a bar coat method on a mirror-finished stainless steel plate (length 500 mm, width 300 mm, thickness 3 mm) treated with a releasing agent. The stainless steel plate with the coating liquid covered therewith was placed in an oven at 120° C. and heated for 60 minutes to dry the coating liquid. The temperature in the oven was then raised to 200° C. over 40 minutes, and the stainless steel plate was held for 20 minutes at this temperature. The oven temperature was then set to 250° C. and the dry coating was heated for 10 minutes to perform final imidization. The temperature was then raised to 345° C. over 15 minutes and heating at this temperature was performed for 10 minutes. The oven was then cooled to room temperature (25° C.), and the stainless steel plate was then taken out of the oven. The low-friction sheet was finally obtained by peeling off the coating film from the stainless steel plate.

2. Properties of Low-Friction Sheet (1) Thickness

The thickness of above-described low-friction sheet was measured with a micrometer. The thickness was 40 μm.

(2) Measurement of Surface Roughness Rsk

The surface roughness Rsk of the air-side surface of the low-friction sheet was measured using a surface roughness meter Surfcorder SE500 (manufactured by Kosaka Laboratory Ltd.). The surface roughness was 1.248.

The measurement conditions at this time were as follows.

Feed speed: 0.1 mm/s

Standard: JIS 2001/ISO97

Cut-off: λc=0.800 mm

Measurement length: 2.500 mm (3) Measurement of Surface Exposure Ratio of PTFE

A scanning electron microscopic image (magnification 100) of the air-side surface of the low-friction sheet was obtained using a low-vacuum scanning electron microscope SEMEDX 3 Type N (manufactured by Hitachi Science Systems, Ltd.) equipped with an energy dispersive X-ray spectrometer. Characteristic X-rays were then measured with the energy dispersive X-ray spectrometer at a plurality of positions on the scanning electron microscopic image. The content ratio of the fluorine element (F (fluorine atoms)+O (oxygen atoms)+C (carbon atoms)=100%), that is, the surface exposure ratio of PTFE, was then calculated from the peak area ratio of the characteristic X-rays. The surface exposure ratio of PTFE on the air-side surface of the low-friction sheet according to the present embodiment was 62.1%.

(4) Measurement of Dynamic Friction Coefficient

The dynamic friction coefficient of the low-friction sheet was measured according to the mode A of the sliding wear test method (JIS K 7218) by using a friction wear test apparatus EFM-III-EN (manufactured by Orientec Co., Ltd.). The initial dynamic friction coefficient was 0.0594. The dynamic friction coefficient after 10 minutes from the test start timing was 0.0581, and the dynamic friction coefficient after 100 minutes from the test start timing was 0.0532. The temporal variation rate of the dynamic friction coefficient was then determined by dividing each of the dynamic friction coefficient after 10 minutes and the dynamic friction coefficient after 100 minutes by the initial dynamic friction coefficient and multiplying by 100. The variation rate of the dynamic friction coefficient after 10 minutes was 97.8%, and the variation rate of the dynamic friction coefficient after 100 minutes was 89.6%. The measurement conditions at this time were as follows. The measurement conditions are accelerated conditions sufficient for durability evaluation of the usual fixing device (conditions which are more severe than those for the usual fixing device).

Pair material: KAPTON-H (registered trade mark) (manufactured by Du-Pont USA).

Test load: 10 kgf (5 kg/cm$^2$).

Sliding speed: first, at the test start timing, the initial dynamic friction coefficient was measured by sliding the pair material with respect to the low-friction sheet at a speed of 0.020 m/s (20 mm/s). Then, the pair material was slid with respect to the low-friction sheet at a speed of 0.500 m/s (500 mm/s) till the next measurement start timing which was 10 minutes after the test start timing. The dynamic friction coefficient after 10 minutes was then measured while sliding the pair material with respect to the low-friction sheet at a speed of 0.020 m/s (20 mm/s) from the timing which was 10 minutes after the test start timing. Then, the pair material was slid with respect to the low-friction sheet at a speed of 0.500 m/s (500 mm/s) till the next measurement start timing which was 100 minutes after the test start timing. The dynamic friction coefficient after 100 minutes was then measured while sliding the pair material with respect to the low-friction sheet at a speed of 0.020 m/s (20 mm/s) from the timing which was 100 minutes after the test start timing.

Lubricant: Sumitec F943 (manufactured by Sumico Lubricant Co., Ltd.)

(5) Overall Evaluation

The overall evaluation of the present example and also subsequent examples and comparative examples was performed on the basis of evaluation criteria shown in Table 1 below. The overall evaluation of the low-friction sheet according to the present embodiment was "A".

TABLE 1

| Overall evaluation | Evaluation criteria |
|---|---|
| A | Initial dynamic friction coefficient: less than 0.0800. Dynamic friction coefficient after 10 minutes have elapsed from the start of the sliding wear test: less than 0.0800. Dynamic friction coefficient after 100 minutes have elapsed from the start of the sliding wear test: less than 0.0800. (Dynamic friction coefficient after 10 minutes)/(Initial friction coefficient) × 100: in a range of less than 100.0%. (Dynamic friction coefficient after 100 minutes)/(Initial friction coefficient) × 100: in a range of less than 100.0%. Variation trend of dynamic friction coefficient: initial > after 10 minutes have elapsed > after 100 minutes have elapsed. |
| B | Initial dynamic friction coefficient: less than 0.0800. Dynamic friction coefficient after 10 minutes have elapsed from the start of the sliding wear test: less than 0.0800. Dynamic friction coefficient after 100 minutes have elapsed from the start of the sliding wear test: less than 0.0800. (Dynamic friction coefficient after 10 minutes)/(Initial friction coefficient) × 100: in a range of 110.0% or less. (Dynamic friction coefficient after 100 minutes)/(Initial friction coefficient) × 100: in a range of 110.0% or less. Variation trend of dynamic friction coefficient: trend other than the trend in overall evaluation "A". |
| C | Initial dynamic friction coefficient: in a range of 0.0800 or more to less than 0.1000. Dynamic friction coefficient after 10 minutes have elapsed from the start of the sliding wear test: in a range of 0.0800 or more to less than 0.1000. Dynamic friction coefficient after 100 minutes have elapsed from the start of the sliding wear test: in a range of 0.0800 or more to less than 0.1000. (Dynamic friction coefficient after 10 minutes)/(Initial friction coefficient) × 100: in a range of 105.0% or less. (Dynamic friction coefficient after 100 minutes)/(Initial friction coefficient) × 100: in a range of 105.0% or less. |

TABLE 1-continued

| Overall evaluation | Evaluation criteria |
|---|---|
| D | Initial dynamic friction coefficient: less than 0.1000. Dynamic friction coefficient after 10 minutes have elapsed from the start of the sliding wear test: less than 0.1000. Dynamic friction coefficient, after 100 minutes have elapsed from the start of the sliding wear test: 0.1000 or more. (Dynamic friction coefficient after 10 minutes)/(Initial friction coefficient) × 100: in a range of 110.0% or less. (Dynamic friction coefficient after 100 minutes)/(Initial friction coefficient) × 100: in a range of 250.0% or less. |

Example 2

A low-friction sheet was obtained and properties thereof were measured in the same manner as in Example 1, except that in "(2) Preparation of polyimide precursor solution containing fluororesin particles of different diameters", the PTFE powder with the median diameter of 0.3 μm was replaced with a PTFE powder with the median diameter of 1.0 μm.

The thickness of the low-friction sheet obtained in the present example was 40 μm, the surface roughness Rsk was 1.236, and the surface exposure ratio of PTFE was 57.5%. Further, the initial dynamic friction coefficient in dynamic friction coefficient measurements was 0.0642, the dynamic friction coefficient after 10 minutes from the measurement start timing was 0.0612, and the dynamic friction coefficient after 100 minutes from the measurement start timing was 0.0603. The variation rate of the dynamic friction coefficient after 10 minutes was 95.3%, and the variation rate of the dynamic friction coefficient after 100 minutes was 93.9%. The overall evaluation of the same low-friction sheet was "A".

Example 3

A low-friction sheet was obtained and properties thereof were measured in the same manner as in Example 1, except that in "(2) Preparation of polyimide precursor solution containing fluororesin particles of different diameters", the PTFE powder with the median diameter of 0.3 μm was added to the polyimide precursor solution such that the content of this PTFE powder in the finally obtained low-friction sheet was 67.5 mass % (45 vol %).

The thickness of the low-friction sheet obtained in the present example was 40 μm, the surface roughness Rsk was 1.346, and the surface exposure ratio of PTFE was 83.9%. Further, the initial dynamic friction coefficient in dynamic friction coefficient measurements was 0.0651, the dynamic friction coefficient after 10 minutes from the measurement start timing was 0.0650, and the dynamic friction coefficient after 100 minutes from the measurement start timing was 0.0628. The variation rate of the dynamic friction coefficient after 10 minutes was 99.8%, and the variation rate of the dynamic friction coefficient after 100 minutes was 96.5%. The overall evaluation of the same low-friction sheet was "A".

Example 4

A low-friction sheet was obtained and properties thereof were measured in the same manner as in Example 1, except that in "(2) Preparation of polyimide precursor solution containing fluororesin particles of different diameters", the PTFE powder with the median diameter of 40 μm was replaced with a PTFE powder with the median diameter of 19.5 μm.

The thickness of the low-friction sheet obtained in the present example was 20 μm, the surface roughness Rsk was 0.966, and the surface exposure ratio of PTFE was 67.3%. Further, the initial dynamic friction coefficient in dynamic friction coefficient measurements was 0.0673, the dynamic friction coefficient after 10 minutes from the measurement start timing was 0.0649, and the dynamic friction coefficient after 100 minutes from the measurement start timing was 0.0534. The variation rate of the dynamic friction coefficient after 10 minutes was 96.4%, and the variation rate of the dynamic friction coefficient after 100 minutes was 79.3%. The overall evaluation of the same low-friction sheet was "A".

Example 5

A low-friction sheet was obtained and properties thereof were measured in the same manner as in Example 1, except that in "(2) Preparation of polyimide precursor solution containing fluororesin particles of different diameters", the PTFE powder with the median diameter of 0.3 μm was added to the polyimide precursor solution such that the content of this PTFE powder in the finally obtained low-friction sheet was 30 mass % (22 vol %).

The thickness of the low-friction sheet obtained in the present example was 40 μm, the surface roughness Rsk was 1.223, and the surface exposure ratio of PTFE was 46.8%. Further, the initial dynamic friction coefficient in dynamic friction coefficient measurements was 0.0685, the dynamic friction coefficient after 10 minutes from the measurement start timing was 0.0664, and the dynamic friction coefficient after 100 minutes from the measurement start timing was 0.0631. The variation rate of the dynamic friction coefficient after 10 minutes was 96.9%, and the variation rate of the dynamic friction coefficient after 100 minutes was 92.1%. The overall evaluation of the same low-friction sheet was "A".

Example 6

A low-friction sheet was obtained and properties thereof were measured in the same manner as in Example 1, except that in "(2) Preparation of polyimide precursor solution containing fluororesin particles of different diameters", a PTFE powder with the median diameter of 6.2 μm was added to the polyimide precursor solution such that the content of this PTFE powder in the finally obtained low-friction sheet was 60 mass % (40 vol %), instead of adding the PTFE powder with the median diameter of 0.3 μm to the polyimide precursor solution such that the content of this PTFE powder in the finally obtained low-friction sheet was 45 mass % (30 vol %).

The thickness of the low-friction sheet obtained in the present example was 40 μm, the surface roughness Rsk was 1.332, and the surface exposure ratio of PTFE was 39.8%. Further, the initial dynamic friction coefficient in dynamic friction coefficient measurements was 0.0799, the dynamic friction coefficient after 10 minutes from the measurement start timing was 0.0786, and the dynamic friction coefficient after 100 minutes from the measurement start timing was 0.0782. The variation rate of the dynamic friction coefficient after 10 minutes was 98.4%, and the variation rate of the dynamic friction coefficient after 100 minutes was 97.9%. The overall evaluation of the same low-friction sheet was "A".

Example 7

A low-friction sheet was obtained and properties thereof were measured in the same manner as in Example 1, except that in "(2) Preparation of polyimide precursor solution containing fluororesin particles of different diameters", a PTFE powder with the median diameter of 3.5 μm was added to the polyimide precursor solution such that the content of this PTFE powder in the finally obtained low-friction sheet was 67.5 mass % (45 vol %), instead of adding the PTFE powder with the median diameter of 0.3 μm to the polyimide precursor solution such that the content of this PTFE powder in the finally obtained low-friction sheet was 45 mass % (30 vol %).

The thickness of the low-friction sheet obtained in the present example was 40 μm, the surface roughness Rsk was 1.430, and the surface exposure ratio of PTFE was 80.1%. Further, the initial dynamic friction coefficient in dynamic friction coefficient measurements was 0.0669, the dynamic friction coefficient after 10 minutes from the measurement start timing was 0.0672, and the dynamic friction coefficient after 100 minutes from the measurement start timing was 0.0656. The variation rate of the dynamic friction coefficient after 10 minutes was 100.4%, and the variation rate of the dynamic friction coefficient after 100 minutes was 98.1%. The overall evaluation of the same low-friction sheet was "B".

Example 8

A low-friction sheet was obtained and properties thereof were measured in the same manner as in Example 1, except that in "(2) Preparation of polyimide precursor solution containing fluororesin particles of different diameters", the PTFE powder with the median diameter of 40.0 μm was added to the polyimide precursor solution such that the content of this PTFE powder in the finally obtained low-friction sheet was 13.6 mass % (10 vol %), and also a PTFE powder with the median diameter of 1.0 μm was added to the polyimide precursor solution such that the content of this PTFE powder in the finally obtained low-friction sheet was 30 mass % (22 vol %), instead of adding the PTFE powder with the median diameter of 0.3 μm to the polyimide precursor solution such that the content of this PTFE powder in the finally obtained low-friction sheet was 45 mass % (30 vol %).

The thickness of the low-friction sheet obtained in the present example was 40 μm, the surface roughness Rsk was 2.215, and the surface exposure ratio of PTFE was 45.5%. Further, the initial dynamic friction coefficient in dynamic friction coefficient measurements was 0.0740, the dynamic friction coefficient after 10 minutes from the measurement start timing was 0.0743, and the dynamic friction coefficient after 100 minutes from the measurement start timing was 0.0670. The variation rate of the dynamic friction coefficient after 10 minutes was 100.4%, and the variation rate of the dynamic friction coefficient after 100 minutes was 90.5%. The overall evaluation of the same low-friction sheet was "B".

Example 9

A low-friction sheet was obtained and properties thereof were measured in the same manner as in Example 1, except that in "(2) Preparation of polyimide precursor solution containing fluororesin particles of different diameters", the PTFE powder with the median diameter of 40.0 μm was added to the polyimide precursor solution such that the content of this PTFE powder in the finally obtained low-friction sheet was 13.6 mass % (10 vol %), and also the PTFE powder with the median diameter of 0.3 μm was replaced with the PTFE powder with the median diameter of 1.0 μm.

The thickness of the low-friction sheet obtained in the present example was 40 μm, the surface roughness Rsk was 2.398, and the surface exposure ratio of PTFE was 57.5%. Further, the initial dynamic friction coefficient in dynamic friction coefficient measurements was 0.0635, the dynamic friction coefficient after 10 minutes from the measurement start timing was 0.0676, and the dynamic friction coefficient after 100 minutes from the measurement start timing was 0.0686. The variation rate of the dynamic friction coefficient after 10 minutes was 106.5%, and the variation rate of the dynamic friction coefficient after 100 minutes was 108.0%. The overall evaluation of the same low-friction sheet was "B".

Example 10

A low-friction sheet was obtained and properties thereof were measured in the same manner as in Example 1, except that in "(2) Preparation of polyimide precursor solution containing fluororesin particles of different diameters", the PTFE powder with the median diameter of 0.3 μm was added to the polyimide precursor solution such that the content of this PTFE powder in the finally obtained low-friction sheet was 75 mass % (50 vol %).

The thickness of the low-friction sheet obtained in the present example was 40 μm, the surface roughness Rsk was 1.506, and the surface exposure ratio of PTFE was 89.5%. Further, the initial dynamic friction coefficient in dynamic friction coefficient measurements was 0.0708, the dynamic friction coefficient after 10 minutes from the measurement start timing was 0.0728, and the dynamic friction coefficient after 100 minutes from the measurement start timing was 0.0742. The variation rate of the dynamic friction coefficient after 10 minutes was 102.8%, and the variation rate of the dynamic friction coefficient after 100 minutes was 104.8%. The overall evaluation of the same low-friction sheet was "B".

Example 11

A low-friction sheet was obtained and properties thereof were measured in the same manner as in Example 1, except that in "(2) Preparation of polyimide precursor solution containing fluororesin particles of different diameters", a PTFE powder with the median diameter of 10.0 μm was added to the polyimide precursor solution such that the content of this PTFE powder in the finally obtained low-friction sheet was 13.6 mass % (10 vol %), instead of adding the PTFE powder with the median diameter of 40.0 μm to the polyimide precursor solution such that the content of this PTFE powder in the finally obtained low-friction sheet was 30 mass % (22 vol %), and also the PTFE powder with the median diameter of 0.3 μm was added to the polyimide precursor solution such that the content of this PTFE powder in the finally obtained low-friction sheet was 30 mass % (22 vol %).

The thickness of the low-friction sheet obtained in the present example was 10 μm, the surface roughness Rsk was 2.380, and the surface exposure ratio of PTFE was 44.6%. Further, the initial dynamic friction coefficient in dynamic friction coefficient measurements was 0.0745, the dynamic friction coefficient after 10 minutes from the measurement start timing was 0.0743, and the dynamic friction coefficient after 100 minutes from the measurement start timing was 0.0744. The variation rate of the dynamic friction coefficient after 10 minutes was 99.7%, and the variation rate of the dynamic friction coefficient after 100 minutes was 99.9%. The overall evaluation of the same low-friction sheet was "B".

Example 12

A low-friction sheet was obtained and properties thereof were measured in the same manner as in Example 1, except that in "(2) Preparation of polyimide precursor solution containing fluororesin particles of different diameters", a PTFE powder with the median diameter of 6.2 µm was added to the polyimide precursor solution such that the content of this PTFE powder in the finally obtained low-friction sheet was 30 mass % (22 vol %), instead of adding the PTFE powder with the median diameter of 0.3 µm to the polyimide precursor solution such that the content of this PTFE powder in the finally obtained low-friction sheet was 45 mass % (30 vol %).

The thickness of the low-friction sheet obtained in the present example was 40 µm, the surface roughness Rsk was 2.287, and the surface exposure ratio of PTFE was 28.6%. Further, the initial dynamic friction coefficient in dynamic friction coefficient measurements was 0.0823, the dynamic friction coefficient after 10 minutes from the measurement start timing was 0.0834, and the dynamic friction coefficient after 100 minutes from the measurement start timing was 0.0824. The variation rate of the dynamic friction coefficient after 10 minutes was 101.3%, and the variation rate of the dynamic friction coefficient after 100 minutes was 100.1%. The overall evaluation of the same low-friction sheet was "C".

Example 13

A low-friction sheet was obtained and properties thereof were measured in the same manner as in Example 1, except that in "(2) Preparation of polyimide precursor solution containing fluororesin particles of different diameters", the PTFE powder with the median diameter of 0.3 µm was replaced with a PTFE powder with the median diameter of 6.2 µm.

The thickness of the low-friction sheet obtained in the present example was 40 µm, the surface roughness Rsk was 1.500, and the surface exposure ratio of PTFE was 33.0%. Further, the initial dynamic friction coefficient in dynamic friction coefficient measurements was 0.0820, the dynamic friction coefficient after 10 minutes from the measurement start timing was 0.0843, and the dynamic friction coefficient after 100 minutes from the measurement start timing was 0.0831. The variation rate of the dynamic friction coefficient after 10 minutes was 102.8%, and the variation rate of the dynamic friction coefficient after 100 minutes was 101.3%. The overall evaluation of the same low-friction sheet was "C".

Example 14

A low-friction sheet was obtained and properties thereof were measured in the same manner as in Example 1, except that in "(2) Preparation of polyimide precursor solution containing fluororesin particles of different diameters", the PTFE powder with the median diameter of 0.3 µm was added to the polyimide precursor solution such that the content of this PTFE powder in the finally obtained low-friction sheet was 13.6 mass % (10 vol %).

The thickness of the low-friction sheet obtained in the present example was 40 µm, the surface roughness Rsk was 1.106, and the surface exposure ratio of PTFE was 19.4%. Further, the initial dynamic friction coefficient in dynamic friction coefficient measurements was 0.0847, the dynamic friction coefficient after 10 minutes from the measurement start timing was 0.0847, and the dynamic friction coefficient after 100 minutes from the measurement start timing was 0.0850. The variation rate of the dynamic friction coefficient after 10 minutes was 100.0%, and the variation rate of the dynamic friction coefficient after 100 minutes was 100.4%. The overall evaluation of the same low-friction sheet was "C".

Example 15

A low-friction sheet was obtained and properties thereof were measured in the same manner as in Example 1, except that in "(2) Preparation of polyimide precursor solution containing fluororesin particles of different diameters", a PTFE powder with the median diameter of 3.5 µm was added to the polyimide precursor solution such that the content of this PTFE powder in the finally obtained low-friction sheet was 13.6 mass % (10 vol %), instead of adding the PTFE powder with the median diameter of 0.3 µm to the polyimide precursor solution such that the content of this PTFE powder in the finally obtained low-friction sheet was 45 mass % (30 vol %).

The thickness of the low-friction sheet obtained in the present example was 40 µm, the surface roughness Rsk was 1.190, and the surface exposure ratio of PTFE was 18.4%. Further, the initial dynamic friction coefficient in dynamic friction coefficient measurements was 0.0923, the dynamic friction coefficient after 10 minutes from the measurement start timing was 0.0911, and the dynamic friction coefficient after 100 minutes from the measurement start timing was 0.0921. The variation rate of the dynamic friction coefficient after 10 minutes was 98.7%, and the variation rate of the dynamic friction coefficient after 100 minutes was 99.8%. The overall evaluation of the same low-friction sheet was "C".

Example 16

A low-friction sheet was obtained and properties thereof were measured in the same manner as in Example 1, except that in "(2) Preparation of polyimide precursor solution containing fluororesin particles of different diameters", the PTFE powder with the median diameter of 40.0 µm was replaced with the PTFE powder with the median diameter of 100.0 µm, and also a PTFE powder with the median diameter of 3.0 µm was added to the polyimide precursor solution such that the content of this PTFE powder in the finally obtained low-friction sheet was 13.6 mass % (10 vol %), instead of adding the PTFE powder with the median diameter of 0.3 µm to the polyimide precursor solution such that the content of this PTFE powder in the finally obtained low-friction sheet was 45 mass % (30 vol %).

The thickness of the low-friction sheet obtained in the present example was 195 µm, the surface roughness Rsk was 0.530, and the surface exposure ratio of PTFE was 20.6%.

Further, the initial dynamic friction coefficient in dynamic friction coefficient measurements was 0.0747, the dynamic friction coefficient after 10 minutes from the measurement start timing was 0.0779, and the dynamic friction coefficient after 100 minutes from the measurement start timing was 0.1600. The variation rate of the dynamic friction coefficient after 10 minutes was 104.3%, and the variation rate of the dynamic friction coefficient after 100 minutes was 214.2%. The overall evaluation of the same low-friction sheet was "D".

Comparative Example 1

A low-friction sheet was obtained and properties thereof were measured in the same manner as in Example 1, except that in "(2) Preparation of polyimide precursor solution containing fluororesin particles of different diameters", the PTFE powder with the median diameter of 40.0 μm was not added, and the PTFE powder with the median diameter of 0.3 μm was added to the polyimide precursor solution such that the content of this PTFE powder in the finally obtained low-friction sheet was 30 mass % (22 vol %).

The thickness of the low-friction sheet obtained in the present comparative example was 40 μm, the surface roughness Rsk was −0.848, and the surface exposure ratio of PTFE was 39.6%. Further, the initial dynamic friction coefficient in dynamic friction coefficient measurements was 0.1042, the dynamic friction coefficient after 10 minutes from the measurement start timing was 0.1074, and the dynamic friction coefficient after 100 minutes from the measurement start timing was 0.1442. The variation rate of the dynamic friction coefficient after 10 minutes was 103.1%, and the variation rate of the dynamic friction coefficient after 100 minutes was 138.4%.

Comparative Example 2

A low-friction sheet was obtained and properties thereof were measured in the same manner as in Example 1, except that in "(2) Preparation of polyimide precursor solution containing fluororesin particles of different diameters", the PTFE powder with the median diameter of 40.0 μm was not added, and the PTFE powder with the median diameter of 0.3 μm was replaced with the PTFE powder with the median diameter of 1.0 μm.

The thickness of the low-friction sheet obtained in the present comparative example was 40 μm, the surface roughness Rsk was −0.624, and the surface exposure ratio of PTFE was 37.1%. Further, the initial dynamic friction coefficient in dynamic friction coefficient measurements was 0.1084, the dynamic friction coefficient after 10 minutes from the measurement start timing was 0.1085, and the dynamic friction coefficient after 100 minutes from the measurement start timing was 0.1500. The variation rate of the dynamic friction coefficient after 10 minutes was 100.1%, and the variation rate of the dynamic friction coefficient after 100 minutes was 138.4%.

TABLE 2

| | Production conditions of low-friction sheet | | | | Properties of low-friction sheet | | | | | | | |
| | Large particles | | Small particles | | | | | Dynamic friction coefficient | | | Variation rate | | |
| | Median diameter (μm) | Amount added (vol %) | Median diameter (μm) | Amount added (vol %) | Thickness (μm) | Rsk | Surface exposure ratio (%) | Initial | After 10 minutes | After 100 minutes | After 10 minutes | After 100 minutes | Overall evaluation |
|---|---|---|---|---|---|---|---|---|---|---|---|---|---|
| Example 1 | 40.0 | 22 | 0.3 | 33 | 40 | 1.248 | 62.1 | 0.0594 | 0.0581 | 0.0532 | 97.8 | 89.6 | A |
| Example 2 | 40.0 | 22 | 1.0 | 30 | 40 | 1.236 | 57.5 | 0.0642 | 0.0612 | 0.0603 | 95.3 | 93.9 | A |
| Example 3 | 40.0 | 22 | 0.3 | 45 | 40 | 1.346 | 83.9 | 0.0651 | 0.0650 | 0.0628 | 99.8 | 96.5 | A |
| Example 4 | 19.5 | 22 | 0.3 | 30 | 20 | 0.966 | 67.3 | 0.0673 | 0.0649 | 0.0534 | 96.4 | 79.3 | A |
| Example 5 | 40.0 | 22 | 0.3 | 22 | 40 | 1.223 | 46.8 | 0.0685 | 0.0664 | 0.0631 | 96.9 | 92.1 | A |
| Example 6 | 40.0 | 22 | 6.2 | 40 | 40 | 1.332 | 39.8 | 0.0799 | 0.0786 | 0.0782 | 98.4 | 97.9 | A |
| Example 7 | 40.0 | 22 | 3.5 | 45 | 40 | 1.430 | 80.1 | 0.0669 | 0.0672 | 0.0656 | 100.4 | 98.1 | B |
| Example 8 | 40.0 | 10 | 1.0 | 22 | 40 | 2.215 | 45.5 | 0.0740 | 0.0743 | 0.0670 | 100.4 | 90.5 | B |
| Example 9 | 40.0 | 10 | 1.0 | 30 | 40 | 2.398 | 57.5 | 0.0635 | 0.0676 | 0.0686 | 106.5 | 108.0 | B |
| Example 10 | 40.0 | 22 | 0.3 | 50 | 40 | 1.506 | 89.5 | 0.0708 | 0.0728 | 0.0742 | 102.8 | 104.8 | B |
| Example 11 | 10.0 | 10 | 0.3 | 22 | 10 | 2.380 | 44.6 | 0.0745 | 0.0743 | 0.0744 | 99.7 | 99.9 | B |
| Example 12 | 40.0 | 22 | 6.2 | 22 | 40 | 2.287 | 28.6 | 0.0823 | 0.0834 | 0.0824 | 101.3 | 100.1 | C |
| Example 13 | 40.0 | 22 | 6.2 | 30 | 40 | 1.500 | 33.0 | 0.0820 | 0.0843 | 0.0831 | 102.8 | 101.3 | C |
| Example 14 | 40.0 | 22 | 0.3 | 10 | 40 | 1.106 | 19.4 | 0.0847 | 0.0847 | 0.0850 | 100.0 | 100.4 | C |
| Example 15 | 40.0 | 22 | 3.5 | 10 | 40 | 1.190 | 18.4 | 0.0923 | 0.0911 | 0.0921 | 98.7 | 99.8 | C |
| Example 16 | 100.0 | 22 | 3.0 | 10 | 195 | 0.530 | 20.6 | 0.0747 | 0.0779 | 0.1600 | 104.3 | 214.2 | D |
| Comparative Example 1 | — | — | 0.3 | 22 | 40 | −0.343 | 39.6 | 0.1042 | 0.1074 | 0.1442 | 103.1 | 138.4 | — |
| Comparative Example 2 | — | — | 1.0 | 30 | 40 | −0.624 | 37.1 | 0.1084 | 0.1085 | 0.1500 | 100.1 | 138.4 | — |

Based on the results presented hereinabove, it was determined that the relationships indicated in Table 3 are likely to be found between the surface roughness Rsk and the surface exposure ratio of PTFE for each overall evaluation.

TABLE 3

| Overall evaluation | Surface roughness and surface exposure ratio of PTFE |
|---|---|
| A | Surface roughness Rsk: in a range of 0.900 (inclusive) to 1.400 (inclusive) Surface exposure ratio of PTFE: in a range of 35.0% (inclusive) to 100.0% (inclusive) |
| B | Surface roughness Rsk: more than 1.400 Surface exposure ratio of PTFE: in a range of 35.0% (inclusive) to 100.0% (inclusive) |

TABLE 3-continued

| Overall evaluation | Surface roughness and surface exposure ratio of PTFE |
|---|---|
| C | Surface roughness Rsk: more than 1.000<br>Surface exposure ratio of PTFE: in a range of 15.0% (inclusive) to less than 35.0% |
| D | Surface roughness Rsk: in a range of 0.500 (inclusive) to 1.000 (inclusive)<br>Surface exposure ratio of PTFE: in a range of 15.0% (inclusive) to less than 35.0% |

INDUSTRIAL APPLICABILITY

The low-friction member according to the present invention is characterized by not losing low-friction properties thereof easily even when used for a relatively long period. The low-friction member can be used as a member of the fixing device of an electrophotographic apparatus such as a copier, a printer, and a facsimile apparatus, in particular, as a sliding member which is interposed between a pressing member that presses a tubular film from the inner side of the tubular film against a pair member (pressurizing roll, fixing roll, etc.) and the tubular film.

The invention claimed is:

1. An image forming apparatus, comprising a low-friction member,
wherein the low-friction member comprises an outermost layer having one surface of the outermost layer as an outermost surface of the low-friction member,
the outermost layer consists of:
a first polytetrafluoroethylene powder with a median diameter being in a range from 10 μm (inclusive) to 100 μm (inclusive);
a second polytetrafluoroethylene powder with a median diameter being in a range from 0.1 μm (inclusive) to 5 μm (inclusive); and
a polyimide resin,
wherein the first polytetrafluoroethylene powder and the second polytetrafluoroethylene powder are partially embedded in the polyimide resin,
a surface roughness Rsk of the outermost surface is in a range of 0.500 or more, and
a surface exposure ratio of the first polytetrafluoroethylene powder and the second polytetrafluoroethylene powder is in a range of 15.0% or more.

2. An image forming apparatus, comprising a low-friction member,
wherein the low-friction member comprises an outermost layer having one surface of the outermost layer as an outermost surface of the low-friction member,
the outermost layer consists of:
a first polytetrafluoroethylene powder with a median diameter being in a range from 10 μm (inclusive) to 100 μm (inclusive);
a second polytetrafluoroethylene powder with a median diameter being in a range from 0.1 μm (inclusive) to 5 μm (inclusive); and
a polyimide resin,
the first polytetrafluoroethylene powder and the second polytetrafluoroethylene powder are partially embedded in the polyimide resin,
a dynamic friction coefficient of the outermost surface after 10 minutes in a sliding wear test according to JIS K 7218 is in a range of 0.1000 or less, and
a variation ratio of the dynamic friction coefficient of the outermost surface after 10 minutes to an initial dynamic friction coefficient of the outermost surface is in a range of 190% or less.

3. An image forming apparatus, comprising a low-friction member,
wherein the low-friction member comprises an outermost layer having one surface of the outermost layer as an outermost surface of the low-friction member,
the outermost layer is obtained by baking a polyimide resin or a precursor of the polyimide resin,
in the polyimide resin or the precursor thereof, a mixture of polytetrafluoroethylene powders is present as a sole lubricating material of the low-friction member, and is melted by the baking,
the mixture of the polytetrafluoroethylene powders consists of:
a first polytetrafluoroethylene powder with a median diameter in a range from 10 μm (inclusive) to 100 μm (inclusive); and
a second polytetrafluoroethylene powder with a median diameter having a range from 0.1 μm (inclusive) to 5 μm (inclusive),
the first polytetrafluoroethylene powder and the second polytetrafluoroethylene powder are partially embedded in the polyimide resin,
a surface roughness Rsk of the outermost surface is in a range of 0.500 or more, and
a surface exposure ratio of the polytetrafluoroethylene powders is in a range of 15.0% or more.

* * * * *